United States Patent
Yamatsu et al.

(10) Patent No.: US 8,238,005 B2
(45) Date of Patent: Aug. 7, 2012

(54) HOLOGRAM MEDIUM MANUFACTURING METHOD, MASTER HOLOGRAM MEDIUM MANUFACTURING METHOD, RECORDING MEDIUM, AND HOLOGRAM MEDIUM MANUFACTURING APPARATUS

(75) Inventors: Hisayuki Yamatsu, Tokyo (JP); Kunihiko Hayashi, Kanagawa (JP); Norihiro Tanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 12/328,226

(22) Filed: Dec. 4, 2008

(65) Prior Publication Data

US 2009/0147333 A1 Jun. 11, 2009

(30) Foreign Application Priority Data

Dec. 7, 2007 (JP) ................................. 2007-317399

(51) Int. Cl.
*G03H 1/20* (2006.01)
*G03H 1/22* (2006.01)
*G03H 1/04* (2006.01)

(52) U.S. Cl. ............................... 359/12; 359/32; 359/35

(58) Field of Classification Search ...................... 359/12
See application file for complete search history.

(56) References Cited

U.S. PATENT DOCUMENTS

| 7,889,407 B2 * | 2/2011 | Sako et al. ....................... 359/27 |
| 2007/0053029 A1 | 3/2007 | Raguin et al. |
| 2008/0037088 A1 | 2/2008 | Sako et al. |

FOREIGN PATENT DOCUMENTS

| JP | 2007-517267 | 6/2007 |
| WO | WO 2005/109411 | 11/2005 |
| WO | WO 2006/125079 A2 | 11/2006 |

OTHER PUBLICATIONS

Robert R. McLeod, et al., "Microholographic multilayer optical disk data storage", Applied Optics, vol. 44, No. 16, Jun. 1, 2005, pp. 3197-3207.

* cited by examiner

*Primary Examiner* — Jade R Chwasz
(74) *Attorney, Agent, or Firm* — Oblon, Spivak, McClelland, Maier & Neustadt, L.L.P.

(57) ABSTRACT

A hologram medium manufacturing method that includes disposing a first pair of master hologram media with a predetermined interval so that the first pair of the master hologram media face each other; forming a master hologram in the master hologram media by irradiating the first pair of the master hologram media with spherical wave light and reference light so that the spherical wave light and the reference light interfere with each other in the master hologram media. The spherical wave light and the reference light have a focal point between the first pair of the master hologram media. The method also includes disposing a hologram medium between the first pair of the master hologram media; and forming a hologram in the hologram medium by irradiating the first pair of the master hologram media with the reference light.

23 Claims, 19 Drawing Sheets

HOLOGRAM MEDIUM MANUFACTURING METHOD, MASTER HOLOGRAM MEDIUM MANUFACTURING METHOD, RECORDING MEDIUM, AND HOLOGRAM MEDIUM MANUFACTURING APPARATUS

CROSS REFERENCES TO RELATED APPLICATIONS

The present invention contains subject matter related to Japanese Patent Application JP 2007-317399 filed in the Japanese Patent Office on Dec. 7, 2007, the entire contents of which being incorporated herein by reference.

BACKGROUND OF THE INVENTION

1. Field of the Invention

The present invention relates to a hologram medium manufacturing method, a master hologram medium manufacturing method, a recording medium, and a hologram medium manufacturing apparatus.

2. Description of the Related Art

As a leading next-generation optical memory, a so-called microhologram system described in "Microholographic multilayer optical disk data storage", R. R. McLeod et al., Appl. Opt., Vol. 44, 2005, p 3197 (hereinafter, referred to as Non-patent Document 1) is proposed.

In this system, when information is recorded, coherent recording light beams are simultaneously emitted to a recording medium from a front and back surface side thereof using two objective lenses so that the recording light beams are focused on the same position, to thereby record a minute hologram.

Further, the light focus positions of the recording light beams are three-dimensionally changed in the recording medium, to thereby three-dimensionally record a minute hologram in the recording medium.

For reproduction of the information, reference light is focused on the recording medium through the objective lens to detect reproduction light generated from the recorded minute hologram.

According to the above-mentioned system, information is three-dimensionally recorded in the recording medium in a bit manner. Therefore, a larger increase in storage capacity than an optical disk in related art is expected (see, for example, Non-patent Document 1).

SUMMARY OF THE INVENTION

The method proposed in related art is suitable to produce a writable optical memory system. However, by the proposed method, it is extremely difficult to produce a ROM-type recording medium required to duplicate a large amount of identical data in terms of a recording time period.

Also in the case of the writable recording medium, it is highly desirable to three-dimensionally record servo information or address information in the recording medium as a microhologram in advance. However, to record such information in advance is extremely difficult for the same reason as the case of the ROM-type recording medium.

In view of the above-mentioned circumstances, it is desirable to provide a hologram medium manufacturing method, a master hologram medium manufacturing method, a recording medium, and a master hologram medium manufacturing apparatus capable of recording a large amount of information on a hologram medium in a short time by using a master hologram medium.

According to an embodiment of the present invention, there is provided a hologram medium manufacturing method. The hologram medium manufacturing method includes: disposing a first pair of master hologram media with a predetermined interval so that the first pair of the master hologram media face each other; forming a master hologram in the master hologram media by irradiating the first pair of the master hologram media with spherical wave light and reference light so that the spherical wave light and the reference light interfere with each other in the master hologram media, the spherical wave light and the reference light having a focal point between the first pair of the master hologram media; disposing a hologram medium between the first pair of the master hologram media; and forming a hologram in the hologram medium by irradiating the first pair of the master hologram media with the reference light.

In the embodiment of the present invention, the master hologram is formed in the master hologram media in the state where the pair of the master hologram media is disposed with the predetermined interval so that they face each other, with the result that a large number of holograms can be formed in a plurality of hologram media in a short time by repeatedly using the pair of the master hologram media. In other words, by disposing the hologram medium between the master hologram media manufactured once and irradiating the master hologram with the reference light repeatedly, the large number of holograms can be formed in each of the large number of hologram media in a short time.

Each of the master hologram media and the hologram medium may have a disk shape. The master hologram media may have a diameter larger than a diameter of the hologram medium.

This structure can eliminate an area in which a hologram is difficult to be formed in the hologram medium.

The reference light is desirable to be plane wave light. With this structure, the spherical wave light and the reference light can be reliably caused to interfere with each other.

The reference light emitted when the master hologram is formed in the master hologram media is desirable to vertically enter the master hologram media in a direction opposite to a direction in which the spherical wave light propagates.

With this structure, it is only necessary to cause the spherical wave light and the reference light to enter the master hologram from one direction. Therefore, the number of parts of the apparatus for forming the master hologram in the master hologram media can be reduced, which can realize the cost reduction.

In this case, the reference light emitted when the hologram is formed in the hologram medium vertically enters the master hologram media from one of the outsides of the first pair of the master hologram media, passes therethrough, is reflected by a reflection mirror, and enters and passes through the master hologram media.

With this structure, it is only necessary to cause the reference light to enter the master hologram media from one direction. Therefore, the number of parts of the apparatus for forming the hologram in the hologram medium can be reduced, which can realize the cost reduction.

The reference light emitted when the master hologram is formed in the master hologram media may obliquely enter the master hologram media from one of the outsides of the first pair of the master hologram media.

With this structure, it is only necessary to cause the master hologram media to be irradiated with the reference light from one of the outsides thereof, which can reduce the number of constituents for performing irradiation with the reference light.

In this case, the reference light emitted when the hologram is formed in the hologram medium may obliquely enter the master hologram media from outsides of the first pair of the master hologram media in opposite directions.

With this structure, the master hologram can be formed in each of the master hologram media.

When the hologram is formed in the hologram medium, the reference light may be reflected by portions on a generatrix of a conical mirror, one of the master hologram media may be irradiated with the reference light, the reference light may be reflected by portions on a generatrix of an inverted conical mirror, and the other master hologram medium may be irradiated with the reference light.

The reference light emitted when the master hologram is formed in the master hologram media may obliquely enter the master hologram media from outsides of the first pair of the master hologram media in opposite directions.

In this case, the reference light emitted when the hologram is formed in the hologram medium can obliquely enter the master hologram media from one of the outsides of the first pair of the master hologram media.

When the master hologram is formed in the master hologram media, a correcting plate having the same refractive index as the hologram medium is desirable to be disposed between the first pair of the master hologram media.

With this structure, a wavefront of the spherical wave light when the master hologram is formed in the master hologram media and a wavefront of the spherical wave light when the hologram medium is disposed between the pair of the master hologram media can be matched with each other.

The master hologram media may be irradiated with beams of the spherical wave light from outsides of the master hologram media so that focal points of the beams of the spherical wave light coincide with each other, and the reference light emitted when the master hologram is formed in the master hologram media may obliquely enter the master hologram media from one of the outsides of the first pair of the master hologram media.

With this structure, the number of parts of the apparatus for performing irradiation with the reference light can be reduced.

In this case, the reference light emitted when the hologram is formed in the hologram medium can obliquely enter the master hologram media from one of the outsides of the first pair of the master hologram media.

With this structure, the number of parts of the apparatus for performing irradiation with the reference light can be reduced.

The reference light emitted when the master hologram is formed in the master hologram media may obliquely enter the master hologram media from outsides of the first pair of the master hologram media and from the same side with respect to an area in which the spherical wave light propagates.

In this case, the reference light emitted when the hologram is formed in the hologram medium can obliquely enter the master hologram media from the outsides of the first pair of the master hologram media and from the same side with respect to the focal point.

With this structure, the spherical wave light can be generated in the master hologram in each of the master hologram media, and the interference of the spherical wave light can lead to formation of the hologram in the hologram medium.

When the hologram is formed in the hologram medium, the reference light may be reflected by portions on a generatrix of a first conical mirror, one of the master hologram media may be irradiated with the reference light reflected, the reference light may be reflected by portions on a generatrix of a second conical mirror, and the other master hologram medium may be irradiated with the reference light reflected.

When the master hologram is formed in the master hologram media, it is desirable that the master hologram media are rotated and a position irradiated with the spherical wave light be shifted in a radial direction of the master hologram media.

With this structure, the master hologram can be spirally formed in the master hologram media.

The hologram medium manufacturing method may further includes: disposing, instead of the first pair of the master hologram media, a second pair of master hologram media with a predetermined interval so that the second pair of the master hologram media face each other; forming another master hologram in the second pair of the master hologram media by irradiating the second pair of the master hologram media with spherical wave light and reference light so that the spherical wave light and the reference light interfere with each other in the second pair of the master hologram media, the spherical wave light and the reference light having a focal point at a different position between the second pair of the master hologram media; disposing the hologram medium between the second pair of the master hologram media; and forming another hologram in the hologram medium by irradiating the second pair of the master hologram media with the reference light.

With this structure, the hologram can be formed in the plurality of layers in the thickness direction of the hologram medium. As a result, a recording capacity of the hologram medium can be significantly increased.

The hologram medium manufacturing method further includes: forming another master hologram in the master hologram media by irradiating the master hologram media with spherical wave light and reference light so that the spherical wave light and the reference light interfere with each other in the master hologram media, the spherical wave light and the reference light having a focal point at a different position in a thickness direction of the first pair of the master hologram media therebetween; and forming another hologram in the hologram medium by irradiating the another master hologram in the first pair of the master hologram media with reference light.

With this structure, the plurality of master holograms are formed at the different positions in the thickness direction of the pair of the master hologram media, and the plurality of master holograms are irradiated with the reference light, with the result that the hologram can be formed at a different position in the thickness direction by using the pair of the master hologram media.

The hologram medium is a writable medium, and the hologram is address information. Thus, the large amount of address information can be recorded on the writable hologram medium in a short time.

The hologram medium is a writable medium, and the hologram is servo information. Thus, the large amount of servo information can be recorded on the writable hologram medium in a short time.

The hologram medium is a read-only medium. Thus, the read-only hologram medium that requires replication of a large amount of data having the same content can be manufactured in a short time.

According to another embodiment of the present invention, there is provided a master hologram medium manufacturing method. The master hologram medium manufacturing method includes: disposing a pair of master hologram media with a predetermined interval so that the pair of the master hologram media face each other; and forming a master hologram in the master hologram media by irradiating the pair of the master hologram media with spherical wave light and reference light so that the spherical wave light and the reference light interfere with each other in the master hologram media, the spherical wave light and the reference light having a focal point between the pair of the master hologram media.

In the embodiment of the present invention, the master hologram can be formed in each of the master hologram media disposed with the predetermined interval. Therefore, by disposing the hologram medium between the master hologram media and irradiating the master hologram with the reference light repeatedly, a large amount of holograms can be formed in the large amount of hologram media in a short time.

Each of the master hologram media and a hologram medium may have a disk shape, and the master hologram media may have a diameter larger than a diameter of the hologram medium.

This structure can eliminate an area in which the hologram is difficult to be formed in the hologram medium.

The reference light is desirable to be plane wave light. With this structure, the spherical wave light and the reference light can be reliably caused to interfere with each other.

The reference light is desirable to vertically enter the master hologram media in a direction opposite to a direction in which the spherical wave light propagates.

With this structure, it is only necessary to cause the spherical wave light and the reference light to enter the master hologram from one direction. Thus, the number of parts of the apparatus for forming the master hologram in the master hologram media can be reduced and the cost reduction can be realized.

According to another embodiment of the present invention, there is provided a recording medium. The recording medium includes: a first master hologram medium in which a master hologram is formed; and a second master hologram medium in which when the second master hologram medium is disposed to face the first master hologram medium with a predetermined interval, the same master hologram is formed at a position symmetrical to a position where the master hologram is formed in the first master hologram medium with respect to a point, and interference fringes of the same master holograms formed at the positions having point symmetry in the first and the second master hologram media are symmetrical to each other with respect to one of a line and a point.

In the embodiment of the present invention, by using the pair of the master hologram media having the above-described structure, a large amount of microholograms can be transferred onto each of a large amount of the hologram media in a short time.

According to another embodiment of the present invention, there is provided a hologram medium manufacturing apparatus. The hologram medium manufacturing medium includes: means for disposing a pair of master hologram media with a predetermined interval so that the pair of the master hologram media face each other; an optical mechanism configured to form a master hologram in the master hologram media by irradiating the pair of the master hologram media with spherical wave light and reference light so that the spherical wave light and the reference light interfere with each other in the master hologram media, the spherical wave light and the reference light having a focal point between the pair of the master hologram media; means for disposing and fixing a hologram medium between the pair of the master hologram media; and an exposing means for forming a hologram in the hologram medium by irradiating the pair of the master hologram media with the reference light.

In the embodiment of the present invention, by forming the master hologram in the master hologram media in a state where the pair of the master hologram media is disposed with the predetermined interval so as to face each other, the large amount of holograms can be formed in the plurality of hologram media in a short time with the repetitive use of the pair of the master hologram media. In other words, by disposing the hologram medium between the master hologram media manufactured once and irradiating the master hologram with the reference light repeatedly, the large amount of holograms can be formed in the large amount of hologram media in a short time.

As described above, according to the embodiments of the present invention, by using the pair of the master hologram media which is disposed with the predetermined interval so as to face each other and in each of which the master hologram is formed, the large amount of information can be recorded on the hologram medium in a short time.

These and other objects, features and advantages of the present invention will become more apparent in light of the following detailed description of best mode embodiments thereof, as illustrated in the accompanying drawings.

BRIEF DESCRIPTION OF DRAWINGS

FIG. 32 is a diagram showing an optical servomechanism of the master hologram exposing apparatus or the like.

DESCRIPTION OF PREFERRED EMBODIMENTS

Hereinafter, embodiments of the present invention will be described with reference to the drawings.

Figure 1:
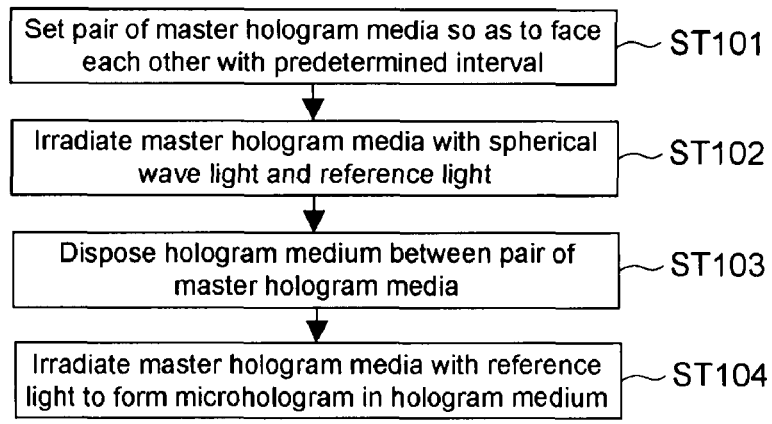
FIG. 1 is a flowchart showing a principle of a master hologram manufacturing method according to an embodiment of the present invention.

FIG. 1 is a flowchart showing a principle of a master hologram manufacturing method according to an embodiment of the present invention.

As shown in FIG. 1, a pair of master hologram media is disposed with a predetermined interval so that the pair of the master hologram media face each other (ST101).

Spherical wave light and reference light that are focused on a position between the pair of the master hologram media are emitted so as to interfere with each other in each of the master hologram media (ST102). As a result, a master hologram is formed in each of the master hologram media.

A hologram medium is disposed between the pair of the master hologram media (ST103).

The master hologram formed in the pair of the master hologram media is irradiated with plane-wave reference light, and the spherical wave light beams generated at the master holograms are caused to interfere with each other in the hologram medium, to thereby form a hologram in the hologram medium (ST104).

Hereinafter, principles of recording the master hologram and a microhologram will be described with reference to FIGS. 2 to 9.

Figure 2:
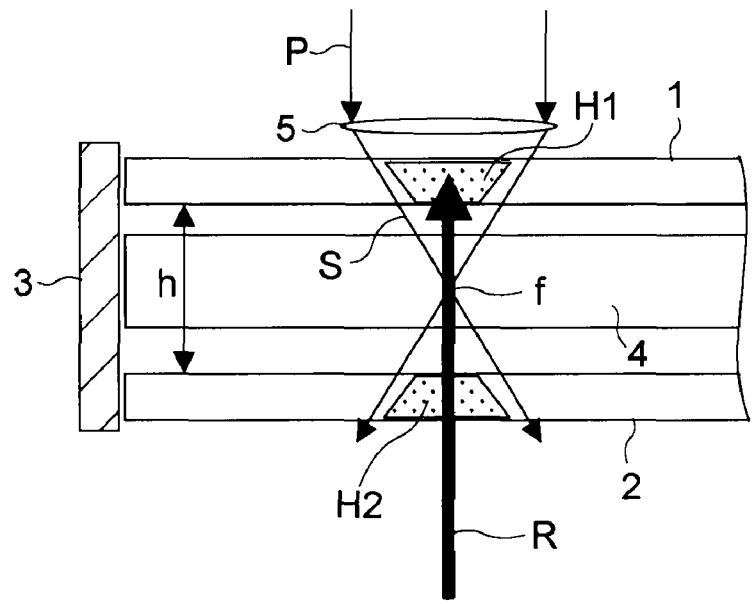
FIG. 2 is a diagram for explaining a master hologram recording principle (1)
Figure 3:
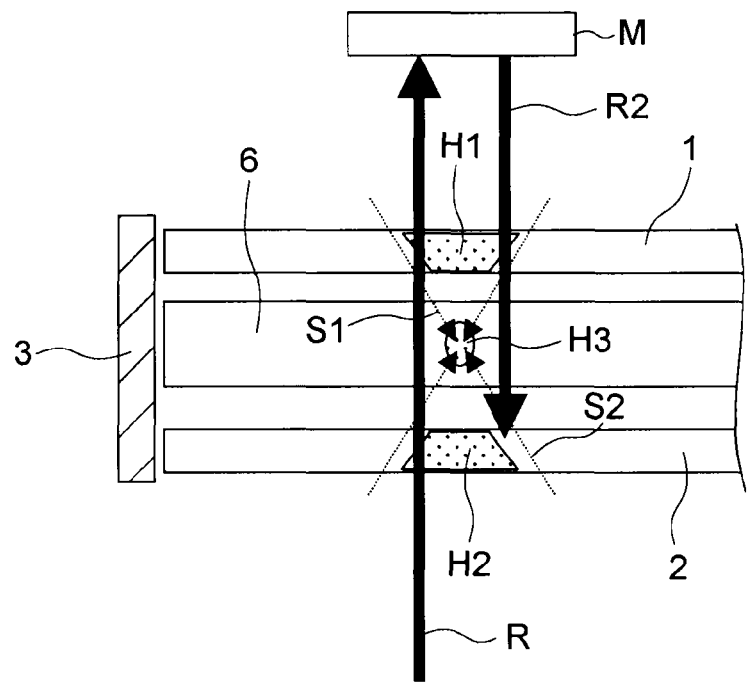
FIG. 3 is a diagram for explaining a microhologram recording principle (1)

FIG. 2 is a diagram for explaining a master hologram recording principle (1). FIG. 3 is a diagram for explaining a microhologram recording principle (1).

As shown in FIG. 2, a pair of master hologram media 1 and 2 is disposed in parallel with a predetermined interval h so that the master hologram media 1 and 2 face each other, by fixing outer peripheries thereof by a medium fixing member 3. In this case, between the pair of the master hologram media 1 and 2, a correcting plate 4 having (nearly) the same refractive index and thickness as a hologram medium 6 (described later) is disposed. The correcting plate 4 is made of glass, for example.

As shown in FIG. 2, an objective lens 5 is irradiated with plane wave light P, and spherical wave light S is caused to enter the master hologram media 1 and 2. Reference light R is caused to vertically enter the master hologram media 1 and 2 in a direction opposite to a direction in which the spherical wave light S propagates. The reference light R is coherent with respect to the spherical wave light S. At this time, optical axes of the spherical wave light S and the reference light R correspond to each other, and therefore a focal point f is positioned between the pair of the master hologram media 1 and 2. As a result, the spherical wave light S and the reference light R interfere with each other in the master hologram media 1 and 2, with the result that a master hologram H1 is formed in the master hologram medium 1 and a master hologram H2 is formed in the master hologram medium 2.

As shown in FIG. 3, between the pair of the master hologram media 1 and 2, the hologram medium 6 is disposed. The hologram medium 6 is a writable or read-only (ROM) medium, for example. A hologram formed in the hologram medium 6 serves as recording information, address information, or servo information.

As shown in FIG. 3, the reference light R is caused to vertically enter the master hologram media 1 and 2 in a direction opposite to a direction in which the spherical wave light S shown in FIG. 2 propagates.

The reference light R vertically enters the master hologram media 1 and 2 from outside of the master hologram medium 2, and is reflected by a mirror M. Reference light R2 reflected by the mirror M enters and passes through the master hologram media 1 and 2 again. The reference light R and the reference light R2 are coherent with respect to each other.

When the reference light R passes through the master hologram H1 of the master hologram medium 1, spherical wave light S1 is generated. When the reference light R2 passes through the master hologram H2 of the master hologram medium 2, spherical wave light S2 is generated. As a result, the spherical wave light S1 and the spherical wave light S2 interfere with each other in the hologram medium 6, to thereby form a microhologram H3 only in the vicinity of the focal point f in which an energy density is high.

An aberration of the objective lens 5 is corrected based on a thickness of the hologram medium 6 (because the microhologram H3 is recorded with a diffraction-limited light spot). For example, when the master hologram media 1 and 2 and the hologram medium 6 have the same refractive index, and the thickness of the master hologram medium 1 (2) is approximately half the thickness of the hologram medium 6, an aberration correction of the light spot generated at the focal position is compensated.

Figure 4:
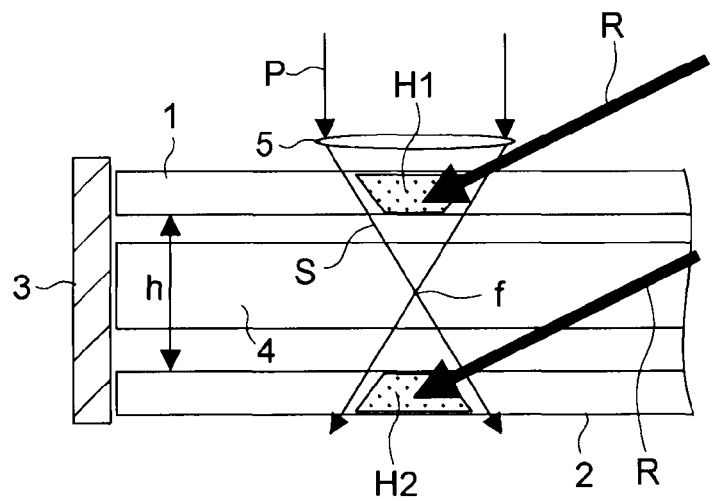
FIG. 4 is a diagram for explaining a master hologram recording principle (2)
Figure 5:
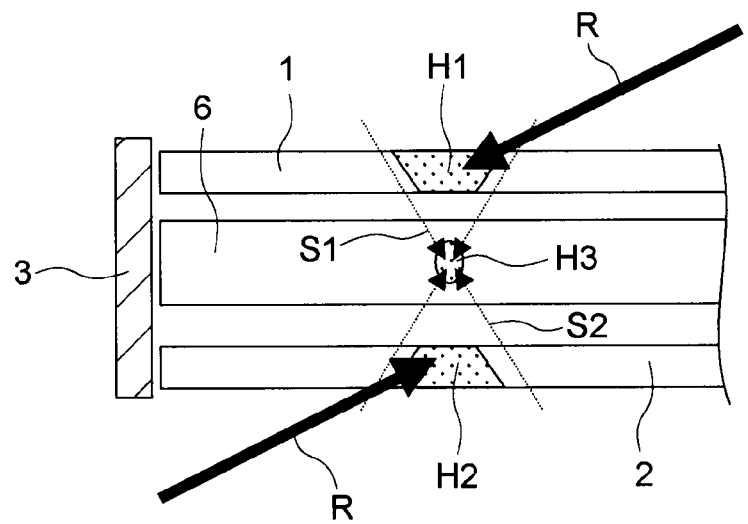
FIG. 5 is a diagram for explaining a microhologram recording principle (2)

FIG. 4 is a diagram for explaining a master hologram recording principle (2). FIG. 5 is a diagram for explaining a microhologram recording principle (2).

As shown in FIG. 4, the pair of the master hologram media 1 and 2 is disposed in parallel to each other with the predetermined interval h so as to face each other by fixing outer peripheries thereof by the medium fixing member 3. In this case, between the pair of the master hologram media 1 and 2, the correcting plate 4 having (nearly) the same refractive index and thickness as the hologram medium 6 is disposed. The correcting plate 4 is made of glass, for example.

As shown in FIG. 4, the objective lens 5 is irradiated with the plane wave light P, and the spherical wave light S is caused to enter the master hologram medium 1. The reference light R is caused to obliquely enter the master hologram media 1 and 2 from outside of the master hologram medium 1. At this time, the focal point f is positioned between the pair of the master hologram media 1 and 2. As a result, the spherical wave light S and the reference light R interfere with each other in the master hologram media 1 and 2, with the result that the master hologram H1 is formed in the master hologram medium 1 and the master hologram H2 is formed in the master hologram medium 2.

As shown in FIG. 5, between the pair of the master hologram media 1 and 2, the hologram medium 6 is disposed.

As shown in FIG. 5, the reference light R is caused to obliquely enter the master holograms H1 and H2 of the master hologram media 1 and 2 from outsides of the pair of the master hologram media 1 and 2 in opposite directions. The reference light R incident on the master hologram medium 1 and the reference light R incident on the master hologram medium 2 are coherent with respect to each other.

When the reference light R is caused to enter the master hologram H1 of the master hologram medium 1, the spherical wave light S1 is generated. When the reference light R is caused to enter the master hologram H2 of the master hologram medium 2, the spherical wave light S2 is generated. As a result, the spherical wave light S1 and the spherical wave light S2 interfere with each other in the hologram medium 6, to thereby form the microhologram H3 only in the vicinity of the focal point f in which the energy density is high.

Figure 6:
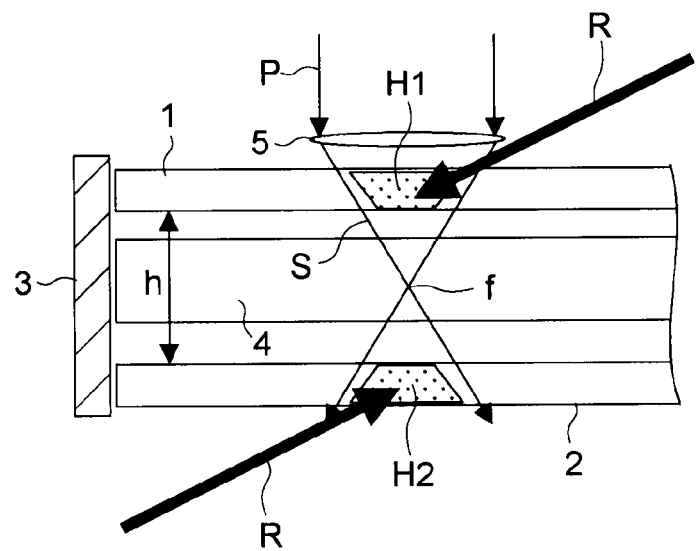
FIG. 6 is a diagram for explaining a master hologram recording principle (3)
Figure 7:
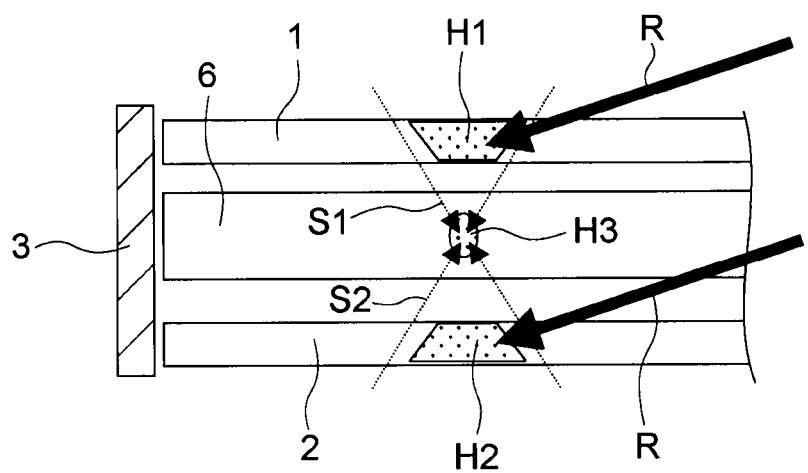
FIG. 7 is a diagram for explaining a microhologram recording principle (3)

FIG. 6 is a diagram for explaining a master hologram recording principle (3). FIG. 7 is a diagram for explaining a microhologram recording principle (3).

As shown in FIG. 6, the pair of the master hologram media 1 and 2 is disposed in parallel to each other with the predetermined interval h so as to face each other by fixing outer peripheries thereof by the medium fixing member 3. In this case, between the pair of the master hologram media 1 and 2, the correcting plate 4 having (nearly) the same refractive index and thickness as the hologram medium 6 is disposed.

As shown in FIG. 6, the objective lens 5 is irradiated with the plane wave light P, and the spherical wave light S is caused to enter the master hologram media 1 and 2. The reference light R is caused to obliquely enter the master hologram media 1 and 2 from outsides of the pair of the master hologram media 1 and 2 in opposite directions. At this time, the focal point f is positioned between the pair of the master hologram media 1 and 2. As a result, the spherical wave light S and the reference light R interfere with each other in the master hologram media 1 and 2, with the result that the master hologram H1 is formed in the master hologram medium 1 and the master hologram H2 is formed in the master hologram medium 2.

As shown in FIG. 7, between the pair of the master hologram media 1 and 2, the hologram medium 6 is disposed.

As shown in FIG. 7, the reference light R is caused to obliquely enter the master holograms H1 and H2 of the master hologram media 1 and 2 from the outside of the master hologram medium 1. The reference light R incident on the master hologram medium 1 and the reference light R incident on the master hologram medium 2 are coherent with respect to each other. The reference light R incident on the master hologram medium 1 and the reference light R incident on the master hologram medium 2 may be the same light emitted from the same laser light source. Further, plane-wave reference light passed through the master hologram medium 1 and the correcting plate 4 may be the reference light R to be emitted to the master hologram medium 2.

When the reference light R is caused to enter the master hologram H1 of the master hologram medium 1, the spherical wave light S1 is generated. When the reference light R is caused to enter the master hologram H2 of the master hologram medium 2, the spherical wave light S2 is generated. As a result, the spherical wave light S1 and the spherical wave light S2 interfere with each other in the hologram medium 6, to thereby form the microhologram H3 only in the vicinity of the focal point f in which the energy density is high.

Figure 8:
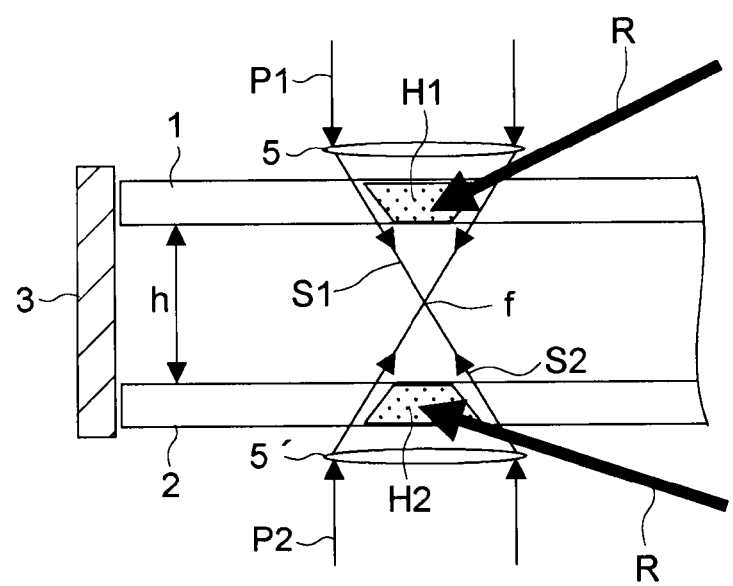
FIG. 8 is a diagram for explaining a master hologram recording principle (4)
Figure 9:
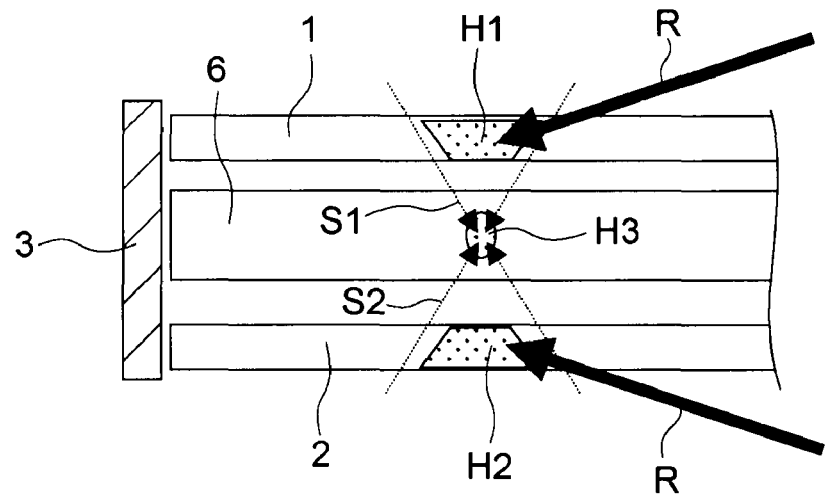
FIG. 9 is a diagram for explaining a microhologram recording principle (4)

FIG. 8 is a diagram for explaining a master hologram recording principle (4). FIG. 9 is a diagram for explaining a microhologram recording principle (4).

As shown in FIG. 8, the pair of the master hologram media 1 and 2 is disposed in parallel to each other with the predetermined interval h so as to face each other by fixing outer peripheries thereof by the medium fixing member 3. In this case, the correcting plate 4 is not disposed between the pair of the master hologram media 1 and 2.

As shown in FIG. 8, the objective lens 5 is irradiated with the plane wave light P1, and the spherical wave light S1 is caused to enter the master hologram medium 1. An objective lens 5' is irradiated with plane wave light P2, and the spherical wave light S2 is caused to enter the master hologram medium 2. The reference light R and the spherical wave light S1 and spherical wave light S2 are coherent with respect to each other. At this time, a focal point f of the spherical wave light S1 and the spherical wave light S2 is positioned between the pair of the master hologram media 1 and 2. That is, optical axes of the objective lenses 5 and 5' are caused to completely correspond to each other. Also, the focal points f of the objective lenses 5 and 5' are caused to completely correspond to each other. The reference light R is caused to obliquely enter the master hologram media 1 and 2 from outsides of the pair of the master hologram media 1 and 2 and from the same side with respect to areas in which the spherical wave light S1 and the spherical wave light S2 propagate (from the right side of propagating areas of the spherical wave light S1 and the spherical wave light S2 in FIG. 8). As a result, the spherical wave light S1 and the reference light R interfere with each other in the master hologram medium 1, with the result that the master hologram H1 is formed in the master hologram medium 1. Further, the spherical wave light S2 and the reference light R interfere with each other in the master hologram medium 2, with the result that the master hologram H2 is formed in the master hologram medium 2.

As shown in FIG. 9, between the pair of the master hologram media 1 and 2, the hologram medium 6 is disposed.

As shown in FIG. 9, the reference light R is caused to obliquely enter the master hologram media 1 and 2 from the outsides of the pair of the master hologram media 1 and 2 and from the same side with respect to the master holograms H1 and H2 (from right sides of the master holograms H1 and H2 in FIG. 9).

When the reference light R is caused to enter the master hologram H1 of the master hologram medium 1, the spherical wave light S1 is generated. When the reference light R is caused to enter the master hologram H2 of the master hologram medium 2, the spherical wave light S2 is generated. As a result, the spherical wave light S1 and the spherical wave light S2 interfere with each other in the hologram medium 6, which forms the microhologram H3 only in the vicinity of the focal point f in which the energy density is high.

Figure 10:
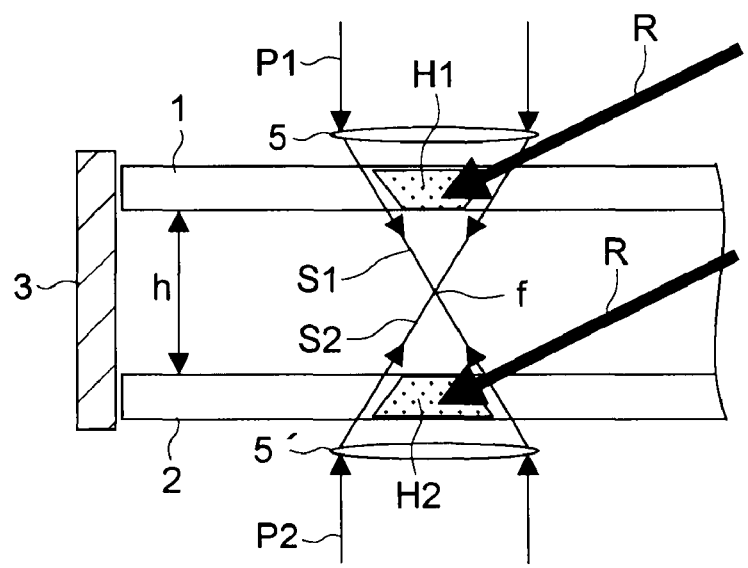
FIG. 10. is a diagram for explaining a master hologram recording principle (5)
Figure 11:
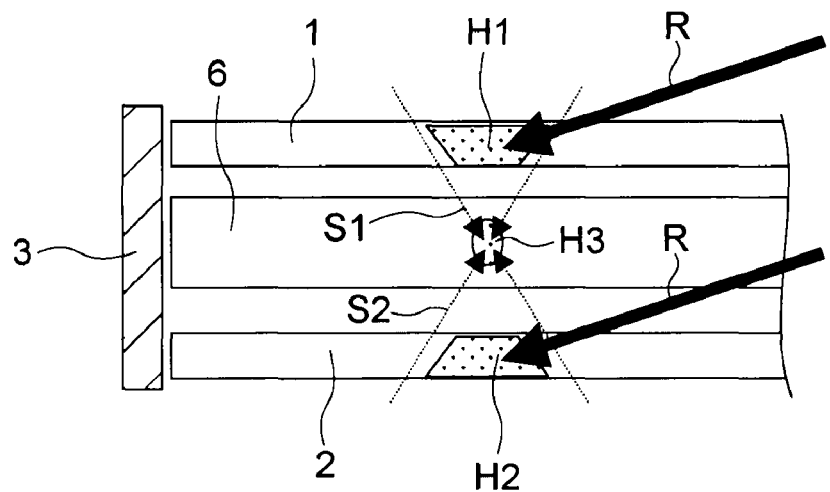
FIG. 11 is a diagram for explaining a microhologram recording principle (5)

FIG. 10 is a diagram for explaining a master hologram recording principle (5). FIG. 11 is a diagram for explaining a microhologram recording principle (5).

As shown in FIG. 10, the pair of the master hologram media 1 and 2 is disposed in parallel to each other with the predetermined interval h so as to face each other by fixing outer peripheries thereof by the medium fixing member 3.

As shown in FIG. 10, the objective lens 5 is irradiated with the plane wave light P1, and the spherical wave light S1 is caused to enter the master hologram medium 1. The objective lens 5' is irradiated with the plane wave light P2, and the spherical wave light S2 is caused to enter the master hologram medium 2. At this time, the focal point f of the spherical wave light S1 and the spherical wave light S2 is positioned between the pair of the master hologram media 1 and 2. The reference light R is caused to obliquely enter the master hologram media 1 and 2 from the outside of the master hologram medium 1 and from the same side with respect to areas in which the spherical wave light S1 and the spherical wave light S2 propagate (from the right side of the propagating areas of the spherical wave light S1 and the spherical wave light S2 in FIG. 10). The reference light R incident on the master hologram medium 1 and the reference light R incident on the master hologram medium 2 may be the same light emitted from the same laser light source. As a result, the spherical wave light S1 and the reference light R interfere with each other in the master hologram medium 1, with the result that the master hologram H1 is formed in the master hologram medium 1. Further, the spherical wave light S2 and the reference light R interfere with each other in the master hologram medium 2, with the result that the master hologram H2 is formed in the master hologram medium 2. The plane-wave reference light passed through the master hologram medium 1 and the correcting plate 4 may be the reference light R incident on the master hologram medium 2.

As shown in FIG. 11, between the pair of the master hologram media 1 and 2, the hologram medium 6 is disposed.

As shown in FIG. 11, the reference light R is caused to obliquely enter the master hologram media 1 and 2 from the outside of the master hologram medium 1 and from the same side with respect to the master holograms H1 and H2 (from the right sides of the master holograms H1 and H2 in FIG. 11). The reference light R incident on the master hologram medium 1 and the reference light R incident on the master hologram medium 2 may be the same light emitted from the same laser light source.

When the reference light R is caused to enter the master hologram H1 of the master hologram medium 1, the spherical wave light S1 is generated. When the reference light R is caused to enter the master hologram H2 of the master hologram medium 2, the spherical wave light S2 is generated. As a result, the spherical wave light S1 and the spherical wave light S2 interfere with each other in the hologram medium 6, to thereby form the microhologram H3 only in the vicinity of the focal point f in which the energy density is high. The plane-wave reference light passed through the master hologram medium 1 and the correcting plate 4 may be the reference light R incident on the master hologram medium 2.

Figure 12:
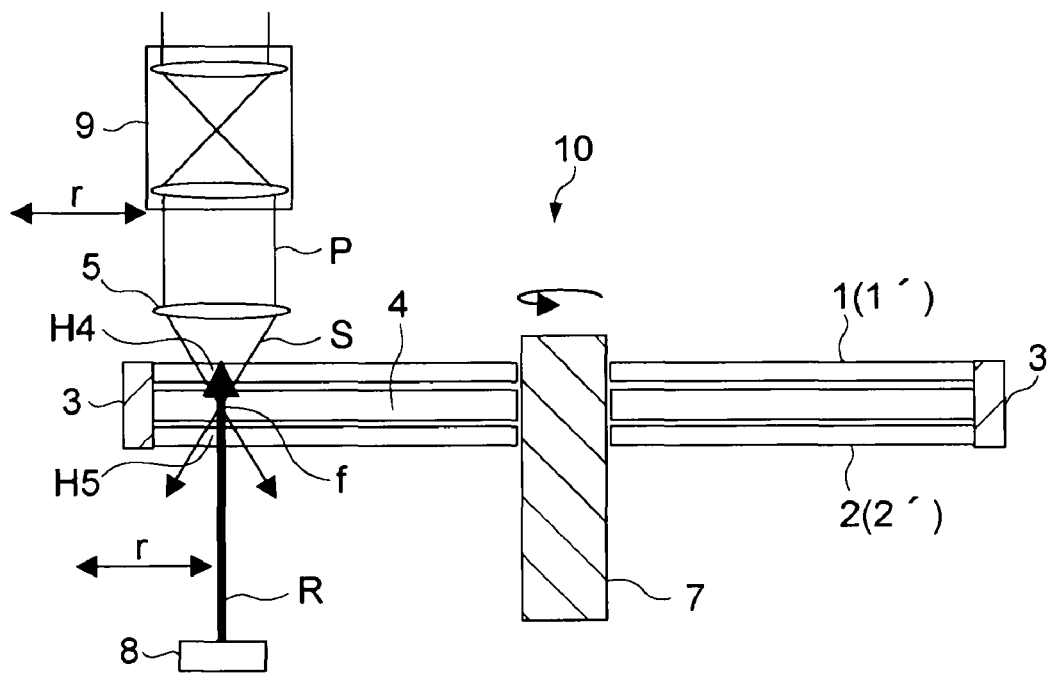
FIG. 12 is a partial cross-sectional diagram showing a master hologram exposing apparatus.
Figure 13:
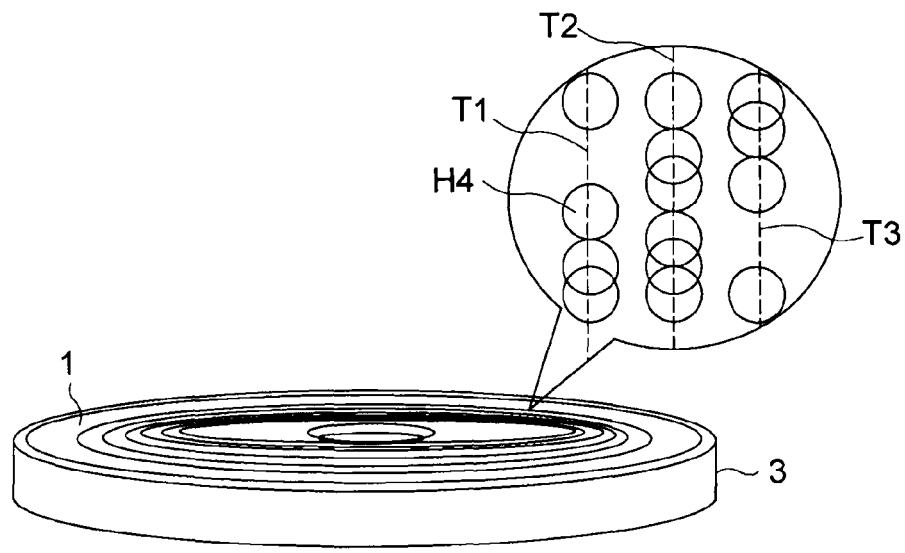
FIG. 13 is a perspective diagram showing a state in which master hologram media are fixed by a medium fixing member.

FIG. 12 is a partial cross-sectional diagram showing a master hologram exposing apparatus. FIG. 13 is a perspective diagram showing a state in which master hologram media 1 and 2 are fixed by the medium fixing member 3.

As shown in FIG. 12, the master hologram exposing apparatus 10 includes a spindle 7, the medium fixing member 3, and the objective lens 5, and a laser light source 8. The spindle 7 can detachably attach the master hologram media 1 and 2.

The medium fixing member 3 fixes in position the master hologram media 1 and 2 that are attached to the spindle 7. The objective lens 5 is used for irradiating the master hologram media 1 and 2 with the spherical wave light S. The laser light source 8 irradiates the master hologram media 1 and 2 with the reference light R.

As shown in FIG. 13, the medium fixing member 3 has approximately a ring shape so as to press and fix the outer periphery of the disk-shaped master hologram medium 1. By the medium fixing member 3, the master hologram media 1 and 2 are fixed in position while being distanced by a predetermined interval h so that they face each other. As shown in FIG. 13, a master hologram H4 is spirally formed along a plurality of tracks T1, T2, and T3 of the master hologram medium 1.

The spindle 7 can be rotated by a driving portion (not shown) with the spindle 7 being provided with the disk-shaped master hologram media 1 and 2 and the disk-shaped correcting plate 4 attached thereto. The correcting plate 4 is attached to the spindle 7 between the master hologram media 1 and 2.

The objective lens 5 and the relay lens 9 including a plurality of lenses constitute a part of an optical system described later. The objective lens 5 causes the plane wave light P from the relay lens 9 to become spherical wave light S. The laser light from the laser light source (not shown in FIG. 12) enters the relay lens 9, and the relay lens 9 is used for adjusting the position of the focal point f of the spherical wave light S in a thickness direction of the master hologram medium 1.

The laser light source 8 functions as a plane-wave laser light source, and causes the reference wave R as a plane wave to vertically enter the master hologram medium 2 in a direction opposite to a propagating direction of the spherical wave light S.

The master hologram exposing apparatus 10 further includes a movement driving mechanism (not shown) for moving the objective lens 5, the relay lens 9, and the laser light source 8 in a radial direction r of the master hologram media 1 and 2. The movement driving mechanism is constituted of a motor and the like.

Figure 14:
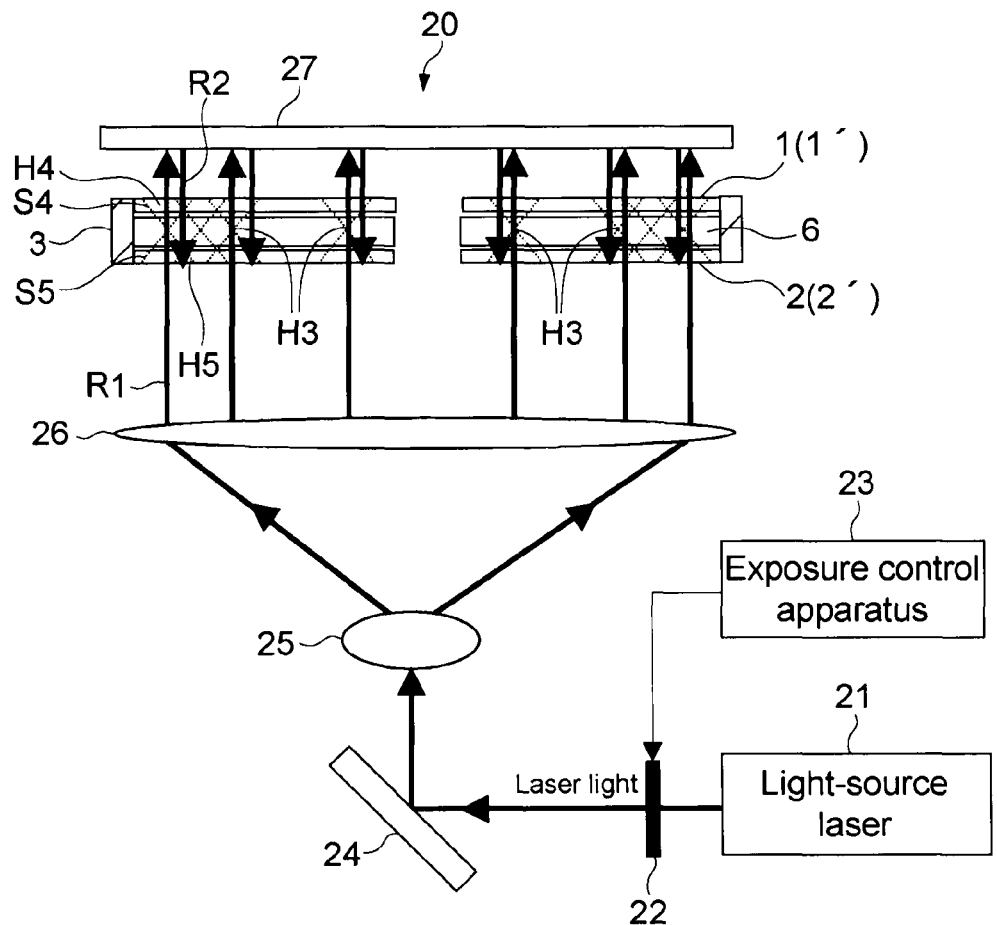
FIG. 14 is a partial cross-sectional diagram of a hologram exposing apparatus.

FIG. 14 is a partial cross-sectional diagram of a hologram exposing apparatus.

As shown in FIG. 14, a hologram exposing apparatus 20 includes a light-source laser 21, a shutter 22, an exposure control apparatus 23, a mirror 24, a lens 25, a lens 26, and a mirror 27.

The light-source laser 21 serves as a laser light source for emitting plane wave light for forming a microhologram in the hologram medium 6.

The shutter 22 adjusts an amount of the laser light that is emitted from the light-source laser 21 and passes through the shutter 22.

The exposure control apparatus 23 controls the amount of the laser light that passes through the shutter 22.

The mirror 24 reflects the laser light emitted from the light-source laser 21 toward the lens 25.

The lens 25 diverges the laser light incident thereto from the mirror 24 and causes the diverged laser light to enter the lens 26.

The lens 26 causes the laser light to become plane wave light and to enter the pair of the master hologram media 1 and 2.

The mirror 27 reflects the laser light that have passed through the master hologram media 1 and 2 and causes the reflected laser light to enter the master hologram media 1 and 2 again.

Next, descriptions will be given on a method of manufacturing the master hologram media 1 and 2 using the master hologram exposing apparatus 10 shown in FIG. 12, and a method of manufacturing the hologram medium 6 using the hologram exposing apparatus 20 shown in FIG. 14.

Figure 15:
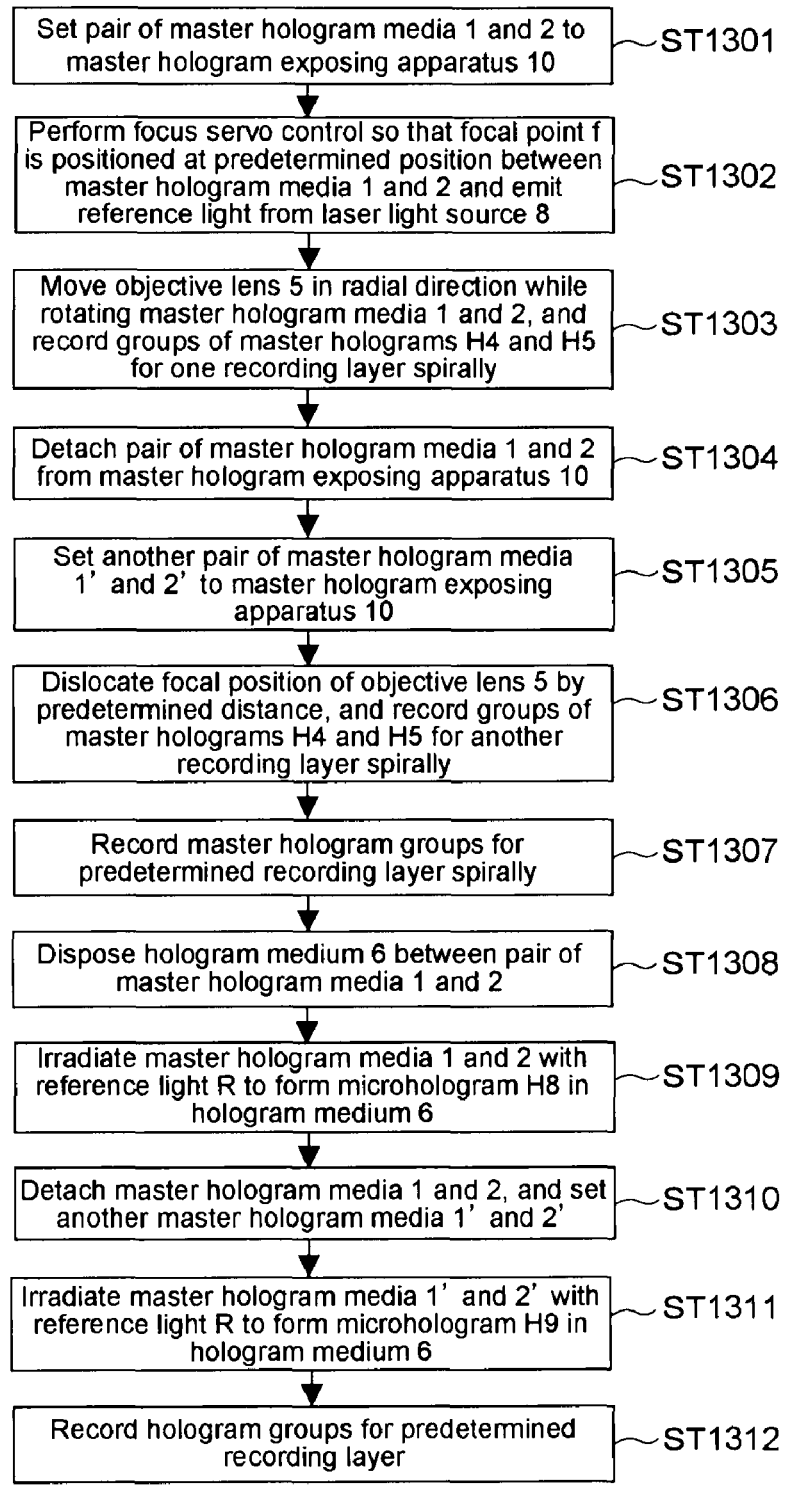
FIG. 15 is a flowchart showing a method of recording the hologram on the hologram medium.
Figure 16:
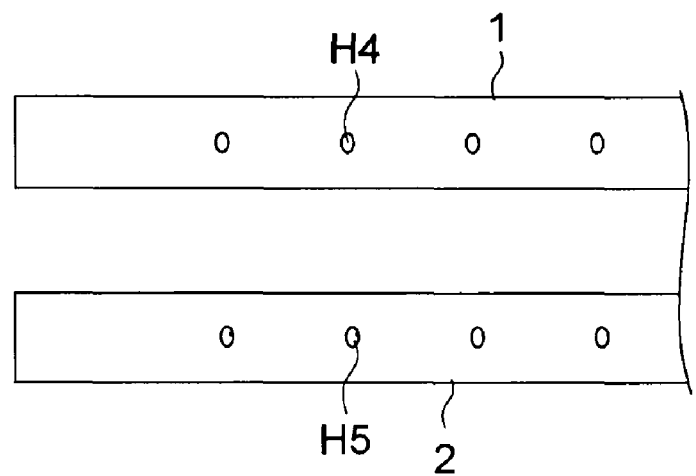
FIG. 16 is a partial cross-sectional diagram showing the master hologram media in each of which the master hologram is recorded on one recording layer thereof.
Figure 17:
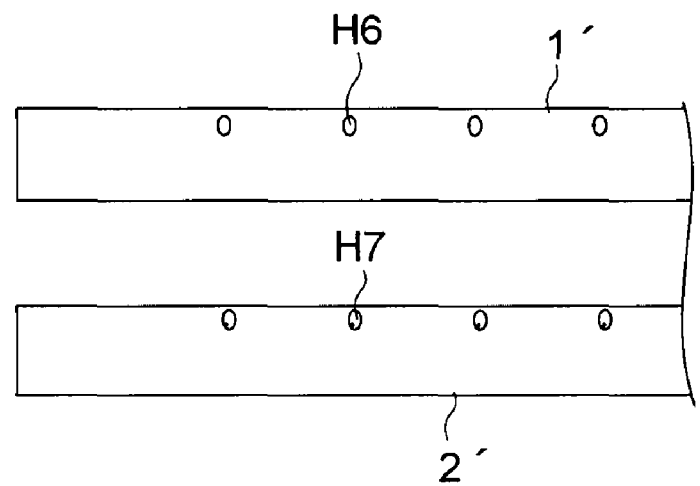
FIG. 17 is a partial cross-sectional diagram showing master hologram media in each of which the master hologram is recorded on another recording layer.
Figure 18:
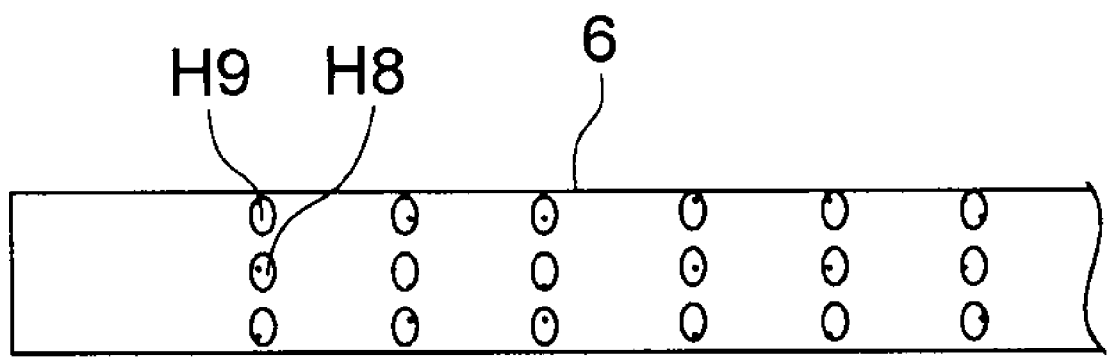
FIG. 18 is a partial cross-sectional diagram showing the hologram medium in which microholograms are formed.

FIG. 15 is a flowchart showing a method of recording the hologram on the hologram medium 6. FIG. 16 is a partial cross-sectional diagram showing the master hologram media 1 and 2 in each of which the master hologram is recorded on one recording layer thereof. FIG. 17 is a partial cross-sectional diagram showing master hologram media in each of which the master hologram is recorded on another recording layer thereof. FIG. 18 is a partial cross-sectional diagram showing the hologram medium in which microholograms are formed.

As shown in FIG. 12, the pair of the master hologram media 1 and 2 is attached to the spindle 7, the outer peripheries thereof are fixed by the medium fixing member 3, and the master hologram media 1 and 2 are set so that they face each other in parallel while being distanced by the predetermined interval h (ST1301).

The relay lens 9 is controlled to set the focal point f of the spherical wave light S at a predetermined position between the pair of the master hologram media 1 and 2, and the laser light source 8 irradiates the predetermined position with the reference light R (ST1302).

The objective lens 5 and the laser light source 8 are moved in the radial direction r of the master hologram medium 1 while the master hologram media 1 and 2 are rotated. At this time, on/off control is performed on the laser light source 8 by an optical mechanism (optical system) described later, to thereby perform on/off control of the plane wave light P and control to determine positions in which the master holograms H4 are formed. As a result, while being irradiated with the plane wave light P, the master hologram media 1 and 2 interfere with the reference light R, and the master holograms H4 and H5 are spirally formed in the master hologram media 1 and 2, respectively, as shown in FIGS. 12, 13, and 16 (ST1303).

The pair of the master hologram media 1 and 2 is detached from the spindle 7 (ST1304).

As shown in FIG. 12, another pair of the master hologram media 1' and 2' is attached to the spindle 7 and fixed in parallel to each other by the medium fixing member 3 (ST1305).

The position of the relay lens 9 shown in FIG. 12 is adjusted to dislocate the position of the focal point f of the spherical wave light S in the thickness direction of the master hologram medium 1, and the spindle 7 is rotated and the objective lens 5 and laser light source 8 are moved in the radial direction r (ST1306). As a result, as shown in FIG. 17, master holograms H6 and H7 are spirally formed in predetermined positions of the master hologram media 1' and 2', respectively.

Similarly, ST1304 to ST1306 are repeatedly performed as many times as predetermined recording layers, to thereby form pairs of master hologram media in each of which the master holograms are spirally formed in the predetermined recording layers (ST1307).

As shown in FIG. 14, the hologram medium 6 is disposed between the master hologram media 1 and 2 using the hologram exposing apparatus 20 (ST1308).

The light-source laser 21 emits laser light. A transmitted amount of the emitted laser light is controlled by the shutter 22. The laser light that has passed through the shutter 22 is reflected by the mirror 24, diverged at the lens 25, caused to become the plane wave through the lens 26, and caused to enter the master hologram media 1 and 2 as the reference light R.

As shown in FIG. 14, the reference light R1 is caused to vertically enter each of the master hologram media 1 and 2 in a direction opposite to the direction in which the spherical wave light S shown in FIG. 12 propagates. The reference light R1 that has entered and passed through the master hologram media 1 and 2 is reflected by the mirror 27, and reference light R2 generated when the reference light R1 is reflected by the mirror 27 enters again the master hologram media 1 and 2 and then passes therethrough.

When the reference light R1 passes through the master hologram H4 of the master hologram medium 1, spherical wave light S4 is generated. When the reference light R2 passes through the master hologram H5 of the master hologram medium 2, spherical wave light S5 is generated. As a result, the spherical wave light S4 and the spherical wave light S5 interfere with each other in the hologram medium 6, with the result that microholograms H8 shown in FIG. 18 are formed (ST1309).

The master hologram media 1 and 2 shown in FIG. 16 are detached from the hologram exposing apparatus 20, and the master hologram media 1' and 2' shown in FIG. 17 are set at the hologram exposing apparatus 20 shown in FIG. 14 (ST1310).

When the reference light R1 passes through the master hologram H6 of the master hologram medium 1' shown in FIG. 17, spherical wave light (not shown) is generated similarly. When the reference light R2 passes through the master hologram H7 of the master hologram medium 2' shown in FIG. 17, spherical wave light is generated similarly. As a result, those spherical wave light beams interfere with each other in the hologram medium 6, with the result that microholograms H9 shown in FIG. 18 are formed (ST1311).

By repeatedly performing ST1310 to ST1311 the predetermined number of times, the hologram medium 6 in which hologram groups in the predetermined recording layers thereof are formed can be manufactured (ST1312).

Figure 19:
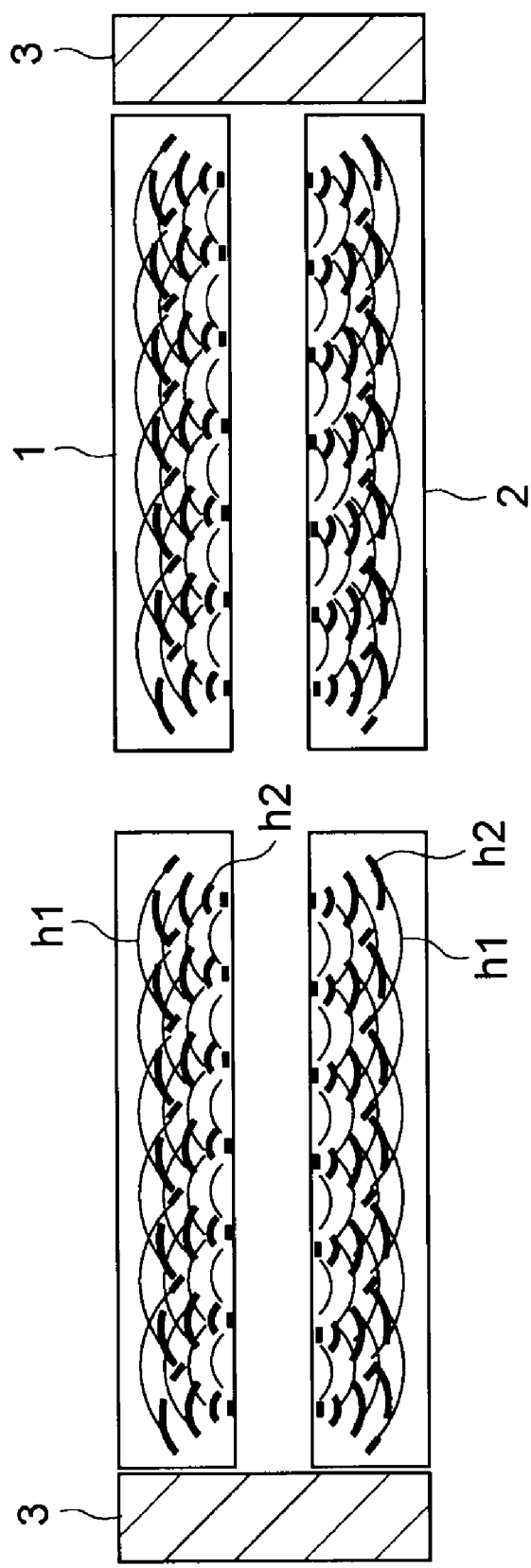
FIG. 19 is a cross-sectional diagram showing detailed structures of the master hologram media.

FIG. 19 is a cross-sectional diagram showing detailed structures of the master hologram media 1 and 2 according to the embodiment of the present invention.

FIG. 19 shows an example in which master holograms h1 and h2 of, e.g., two layers are formed in each of the master hologram media 1 and 2. As shown in FIG. 12, the spherical wave light S and the reference light R interfere with each other in the master hologram media 1 and 2, interference fringes are formed as shown in FIG. 19, and the master holograms h1 and h2 are formed in different layers.

Specifically, when the pair of the master hologram media 1 and 2 is located so that they face each other with the predetermined interval as shown in FIG. 19, the same master holograms are formed at positions that are symmetrical with respect to a point (which is equidistant from the master hologram media 1 and 2 on a center axis of the pair of the master hologram media 1 and 2) in the master hologram media 1 and 2 according to the embodiment of the present invention. The same master holograms form interference fringes that are symmetrical with respect to a line (which is equidistant from a pair of the master holograms). It should be noted that the master holograms formed at the positions may be interference fringes that are symmetrical with respect to a point (which is equidistant from the master holograms on a center axis of the pair of the master holograms).

With the use of the pair of the master hologram media 1 and 2 having the above-described structures, a large amount of microholograms H3 can be transferred onto a large amount of the hologram media 6 in a short time.

A description will be given on a method of manufacturing a microhologram medium of a first modified example. It should be noted that in the first and subsequent modified examples, constituents which are the same as those in the above embodiment are denoted by the same reference numerals and symbols, and their descriptions are omitted and different points will be mainly described.

Figure 20:
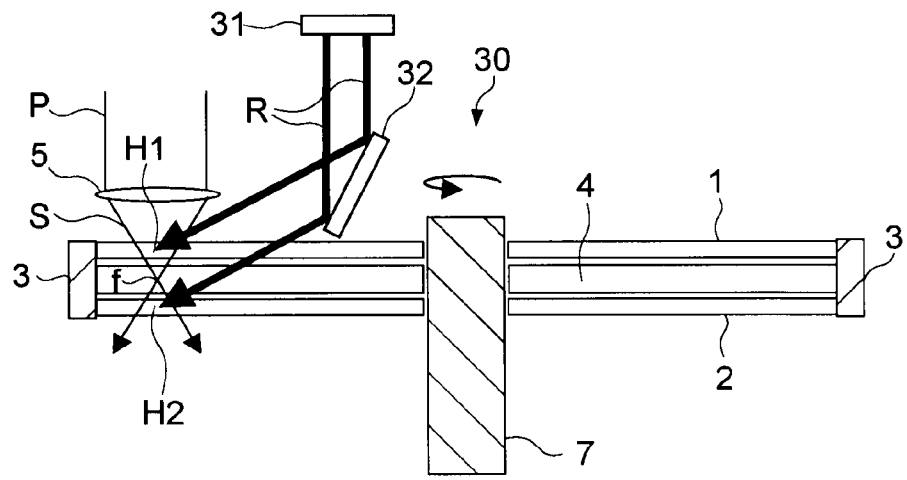
FIG. 20 is a partial cross-sectional diagram of a master hologram exposing apparatus of a first modified example.

FIG. 20 is a partial cross-sectional diagram of a master hologram exposing apparatus of the first modified example.

As shown in FIG. 20, a master hologram exposing apparatus 30 includes a laser light source 31 instead of the laser light source 8, and further includes a mirror 32 which causes laser light emitted from the laser light source 31 to obliquely enter the master hologram media 1 and 2.

The laser light source 31 emits laser light and causes the laser light to enter the mirror 32.

The mirror 32 causes the laser light emitted from the laser light source 31 to obliquely enter the master hologram media 1 and 2 from outside of the master hologram medium 1 as the reference light R.

As shown in FIG. 20, the objective lens 5 is irradiated with the plane wave light P, the spherical wave light S is caused to enter the master hologram medium 1, and the reference light R is reflected by the mirror 32 and caused to obliquely enter the master hologram media 1 and 2 from the outside of the master hologram medium 1. At this time, the focal point f is set between the pair of the master hologram media 1 and 2. As a result, the spherical wave light S and the reference light R interfere with each other in the master hologram media 1 and 2, and the master holograms H1 and H2 are formed in the master hologram media 1 and 2, respectively.

With this structure, it is only necessary to provide a single light source (not shown) that emits the plane wave light P in order to form the spherical wave light S. Therefore, the number of parts of the master hologram exposing apparatus 30 can be reduced and cost reduction can be achieved. In addition, the master hologram media 1 and 2 can be irradiated with the laser light emitted from the laser light source 31 as the reference light R. Thus, the number of parts such as the light source and the lens can be reduced, and further cost reduction can be achieved.

Figure 21:
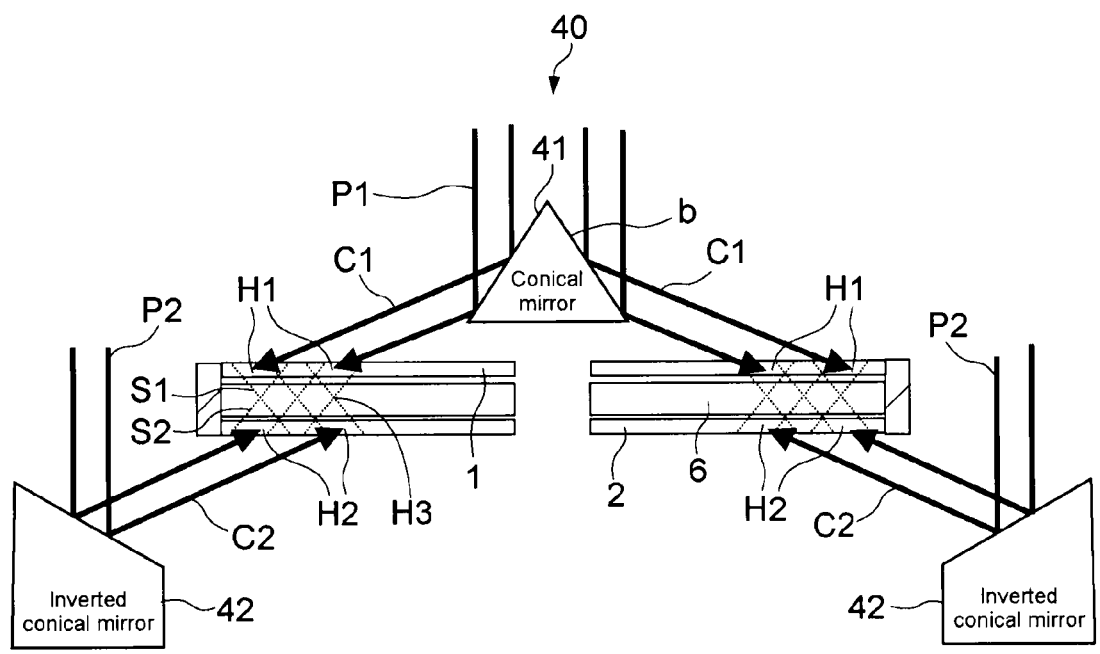
FIG. 21 is a partial cross-sectional diagram showing a hologram exposing apparatus of the first modified example.

FIG. 21 is a partial cross-sectional diagram showing a hologram exposing apparatus of the first modified example.

A hologram exposing apparatus 40 shown in FIG. 21 is used when the master hologram exposing apparatus 30 shown in FIG. 20 is used.

As shown in FIG. 21, the hologram exposing apparatus 40 includes a conical mirror 41 and an inverted conical mirror 42 instead of the lens 26, the mirror 27, and the like shown in FIG. 14, unlike the hologram exposing apparatus 20 shown in FIG. 14.

The conical mirror 41 reflects the plane wave light P1 at portions on a generatrix thereof to generate cone-like shaped light C1, and causes the generated cone-like shaped light C1 to enter the master hologram medium 1 as reference light. The conical mirror 41 is provided at a position that roughly corresponds to the center of the master hologram medium 1 and while being distanced from the master hologram medium 1.

The inverted conical mirror 42 reflects the plane wave light P2 at portions on an inclined and curved surface (generatrix) thereof to generate cone-like shaped light C2, and causes the generated cone-like shaped light C2 to enter the master hologram medium 2 as reference light. The inverted conical mirror 42 is annularly disposed outside the outer peripheries of the master hologram media 1 and 2 on a side opposite to the conical mirror 41 over the master hologram media 1 and 2.

The plane wave light P1 and the plane wave light P2 shown in FIG. 21 are emitted from the light source laser 21 and pass through the lens 26 to be generated as shown in FIG. 14, for example. The plane wave light P1 and the plane wave light P2 are coherent with each other.

As shown in FIG. 21, the cone-like shaped light C1 and the cone-like shaped light C2 as the reference light are caused to obliquely enter the master holograms H1 and H2 of the master hologram media 1 and 2 simultaneously from the outside of the pair of the master hologram media 1 and 2 in opposite directions.

When the cone-like shaped light C1 as the reference light enters the master holograms H1 of the master hologram medium 1, a large number of spherical wave light beams S1 are generated. When the cone-like shaped light C2 as the reference light enters the master holograms H2 of the master hologram medium 2, a large number of spherical wave light beams S2 are generated. As a result, a large number of spherical wave light beams S1 and spherical wave light beams S2 interfere with each other in the hologram medium 6, and therefore a large number of microholograms H3 are formed at the same time.

With this structure, the conical mirror 41 is irradiated with the plane wave light P1, the plane wave light P1 is reflected at the portions on a generatrix b of the conical mirror 41, and the plurality of master holograms H1 are irradiated with the cone-like shaped light C1 at the same time. In addition, the inverted conical mirror 42 is irradiated with the plane wave light P2, the plane wave light P2 is reflected at the portions of the inclined and curved surface of the inverted conical mirror 42, and the plurality of master holograms H2 can be irradiated with the cone-like shaped light C2 at the same time. Accordingly, a large amount of microholograms H3 can be formed at the same time, with the result that the hologram medium 6 can be formed in a short time.

Figure 22:
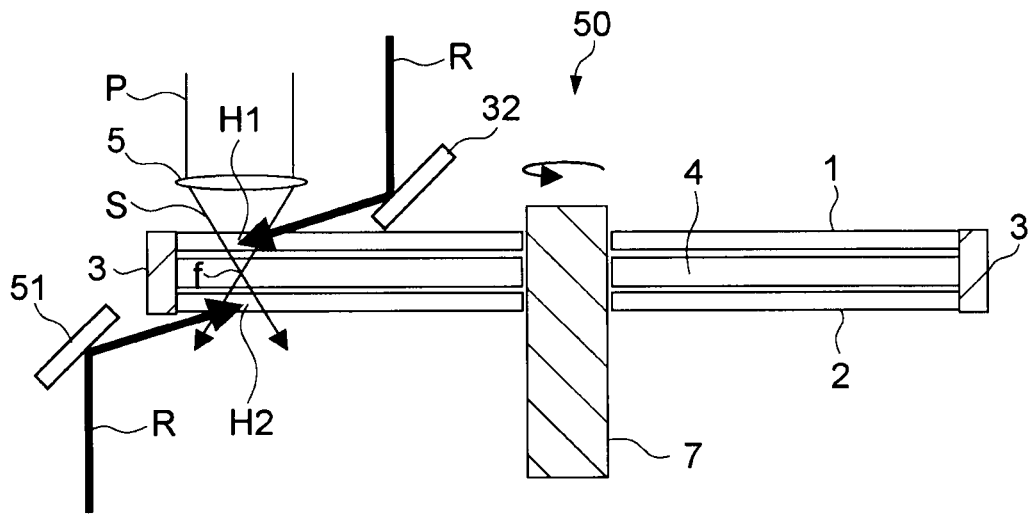
FIG. 22 is a partial cross-sectional diagram showing a master hologram exposing apparatus of a second modified example.

FIG. 22 is a partial cross-sectional diagram showing a master hologram exposing apparatus of a second modified example.

As shown in FIG. 22, a master hologram exposing apparatus 50 includes a mirror 51, unlike the master hologram exposing apparatus 30 shown in FIG. 20.

The mirror 32 reflects the incident reference light R and causes the reflected reference light R to obliquely enter the master hologram medium 1 from the outside of the master hologram medium 1. The incident reference light R interfere with the spherical wave light S in the master hologram medium 1, and thus the master hologram H1 is formed.

The mirror 51 is disposed outside the outer peripheries of the master hologram media 1 and 2. The mirror 51 reflects the incident reference light R, and causes the reflected reference light R to obliquely enter the master hologram medium 2 from the outside thereof. The reference light R that has been reflected by the mirror 51 travels in a direction opposite to the reference light R that has been reflected by the mirror 32. The reference light R that has entered the master hologram medium 2 interferes with the spherical wave light S in the master hologram medium 2, and thus the master hologram H2 is formed.

With this structure, the master hologram H1 can also be formed in the master hologram medium 1, and the master hologram H2 can also be spirally formed in the master hologram medium 2.

Figure 23:
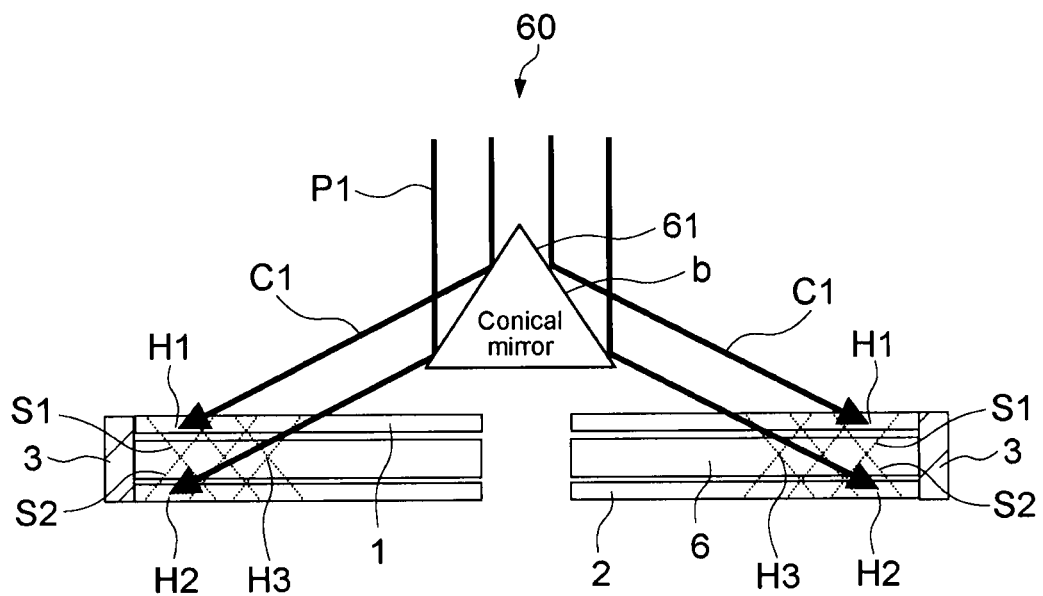
FIG. 23 is a partial cross-sectional diagram showing a hologram exposing apparatus of the second modified example.

FIG. 23 is a partial cross-sectional diagram showing a hologram exposing apparatus of the second modified example.

As shown in FIG. 23, a hologram exposing apparatus 60 includes a conical mirror 61. The conical mirror 61 reflects the plane wave light P1 incident on the conical mirror 61 as the reference light at portions on the generatrix b thereof, and causes the reflected cone-like shaped light C1 to obliquely enter the master hologram media 1 and 2 from the outside of the master hologram medium 1.

The cone-like shaped light C1 as the reference light enters the master hologram H1 of the master hologram medium 1, to thereby generate the spherical wave light S1. In addition, the cone-like shaped light C1 as the reference light enters the master hologram H2 of the master hologram medium 2, to thereby generate the spherical wave light S2. As a result, the spherical wave light S1 and the spherical wave light S2 interfere with each other in the hologram medium 6, and thus the microhologram H3 is formed.

Figure 24:
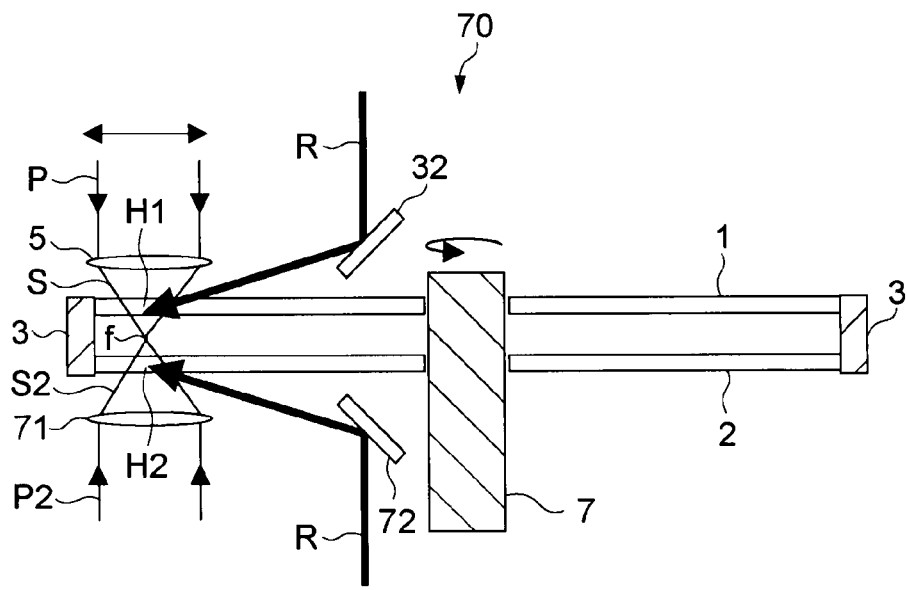
FIG. 24 is a partial cross-sectional diagram showing a master hologram exposing apparatus of a third modified example.

FIG. 24 is a partial cross-sectional diagram showing a master hologram exposing apparatus of a third modified example.

As shown in FIG. 24, a master hologram exposing apparatus 70 further includes an objective lens 71 and a mirror 72 instead of the mirror 51, unlike the master hologram exposing apparatus 50 shown in FIG. 22.

The objective lens 71 causes the plane wave light P2 incident thereon to become the spherical wave light S2. The focal point f of the spherical wave light S2 coincides with the focal point f of the spherical wave light S that has passed through the objective lens 5. Optical axes of the spherical wave light S and the spherical wave light S2 are set to be perpendicular to the master hologram medium 1, for example.

The mirror 72 is disposed at a position symmetrical to the mirror 32 with respect to the master hologram media 1 and 2. The mirror 72 reflects the reference light R that has entered the mirror 72 and causes the reflected reference light R to obliquely enter the master hologram medium 2 from the outside of the master hologram medium 2.

As shown in FIG. 24, the objective lens 5 is irradiated with the plane wave light P, and the spherical wave light S is caused to enter the master hologram medium 1. Further, the objective lens 71 is irradiated with the plane wave light P2, and the spherical wave light S2 is caused to enter the master hologram medium 2. At this time, the focal point f of the spherical wave light S and the focal point f of the spherical wave light S2 are positioned at the same position between the pair of the master hologram media 1 and 2. The reference light R is caused to obliquely enter the master hologram media 1 and 2 from the outsides of the pair of the master hologram media 1 and 2 and from the same side with respect to an area in which the spherical wave light S and the spherical wave light S2 propagate (from the right side of the area in which the spherical wave light S and the spherical wave light S2 propagate in FIG. 24). As a result, the spherical wave light S and the reference light R interfere with each other in the master hologram medium 1, and thus the master hologram H1 is formed in the master hologram medium 1. Further, the spherical wave light S2 and the reference light R interfere with each other in the master hologram medium 2, and thus the master hologram H2 is formed in the master hologram medium 2.

Figure 25:
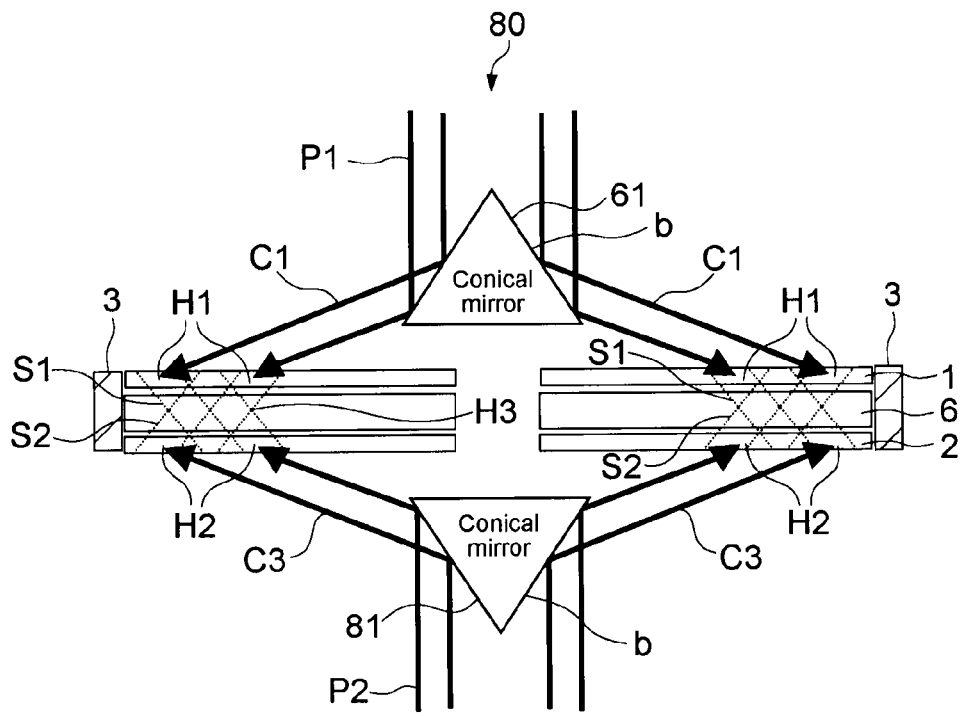
FIG. 25 is a partial cross-sectional diagram showing a hologram exposing apparatus of the third modified example.

FIG. 25 is a partial cross-sectional diagram showing a hologram exposing apparatus of the third modified example.

As shown in FIG. 25, a hologram exposing apparatus 80 further includes a conical mirror 81, unlike the hologram exposing apparatus 60 shown in FIG. 23.

The conical mirror 81 is disposed to be symmetrical to the conical mirror 61 with respect to the master hologram media 1 and 2. The conical mirror 81 reflects the plane wave light P2 incident thereon at portions on a genaratrix thereof to generate cone-like shaped light C3, and causes the generated cone-like shaped light C3 to enter the master hologram medium 2.

As shown in FIG. 25, before exposure is performed, the hologram medium 6 is disposed between the pair of the master hologram media 1 and 2.

As shown in FIG. 25, the cone-like shaped light C1 as the reference light is caused to obliquely enter the master hologram medium 1 from the outside of the master hologram medium 1, and the cone-like shaped light C3 as the reference light is caused to obliquely enter the master hologram medium 2 from the outside of the master hologram medium 2.

When the cone-like shaped light C1 as the reference light enters a large number of master holograms H1 in the master hologram medium 1, a large number of spherical wave light beams S1 are generated. When the cone-like shaped light C3 as the reference light enters a large number of master holograms H2 in the master hologram medium 2, a large number of spherical wave light beams S2 are generated. As a result, a large number of spherical wave light beams S1 and spherical wave light beams S2 interfere with each other in the hologram medium 6, and thus a large number of microholograms H3 are formed.

With this structure, the cone-like shaped light C1 generated by the conical mirror 61 can be caused to enter the plurality of master holograms H1 in the master hologram medium 1, and the cone-like shaped light C3 generated by the conical mirror 81 can be caused to enter the plurality of master holograms H2 in the master hologram medium 2. As a result, the spherical wave light S1 generated in the master holograms H1 and the spherical wave light S2 generated in the master holograms H2 interfere with each other in the hologram medium 6, with the result that the plurality of microholograms H3 can be formed by one-time exposure in a short time.

To realize this, by the mirrors 32 and 72 of the master hologram exposing apparatus 70 shown in FIG. 24, the reference light R can be caused to travel toward an outer side from the center side of the master hologram medium 1. That is, mechanical interference between the laser light source (not shown) that emits the reference light R toward the mirror 72 and the spindle 7 can be avoided.

Figure 26:
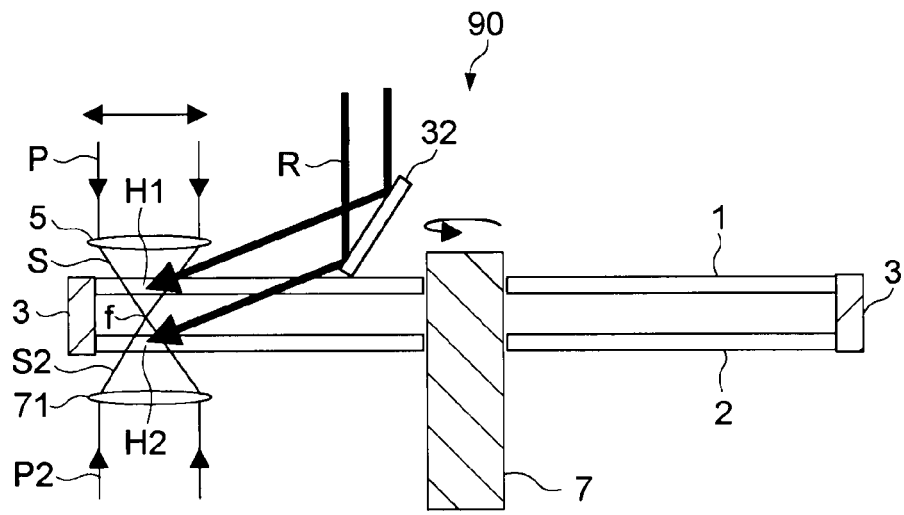
FIG. 26 is a partial cross-sectional diagram showing a master hologram exposing apparatus of a fourth modified example.

FIG. 26 is a partial cross-sectional diagram showing a master hologram exposing apparatus of a fourth modified example.

As shown in FIG. 26, a master hologram exposing apparatus 90 does not include the mirror 72 but includes the mirror 32 that reflects the reference light R toward the master hologram media 1 and 2, unlike the master hologram exposing apparatus 70 shown in FIG. 24.

As shown in FIG. 26, the objective lens 5 is irradiated with the plane wave light P, and the spherical wave light S1 is caused to enter the master hologram medium 1. The objective lens 71 is irradiated with the plane wave light P2, and the spherical wave light S2 is caused to enter the master hologram medium 2. At this time, the focal point f of the spherical wave light S and the focal point f of the spherical wave light S2 coincide with each other between the pair of the master hologram media 1 and 2. The reference light R is caused to obliquely enter the master hologram media 1 and 2 from the outside of the master hologram medium 1 and from the same side with respect to areas in which the spherical wave light S and the spherical wave light S2 propagate (from the right side of the propagating areas of the spherical wave light S and the spherical wave light S2 in FIG. 26). As a result, the spherical wave light S and the reference light R interfere with each other in the master hologram medium 1, and thus the master hologram H1 is formed in the master hologram medium 1.

The spherical wave light S2 and the reference light R interfere with each other in the master hologram medium 2, and thus the master hologram H2 is formed in the master hologram medium 2.

In this case, to form the hologram in the hologram medium 6, the hologram exposing apparatus 60 shown in FIG. 23 is used. As a result, the hologram can be formed in the hologram medium 6 in the same way within a short time.

Figure 27:
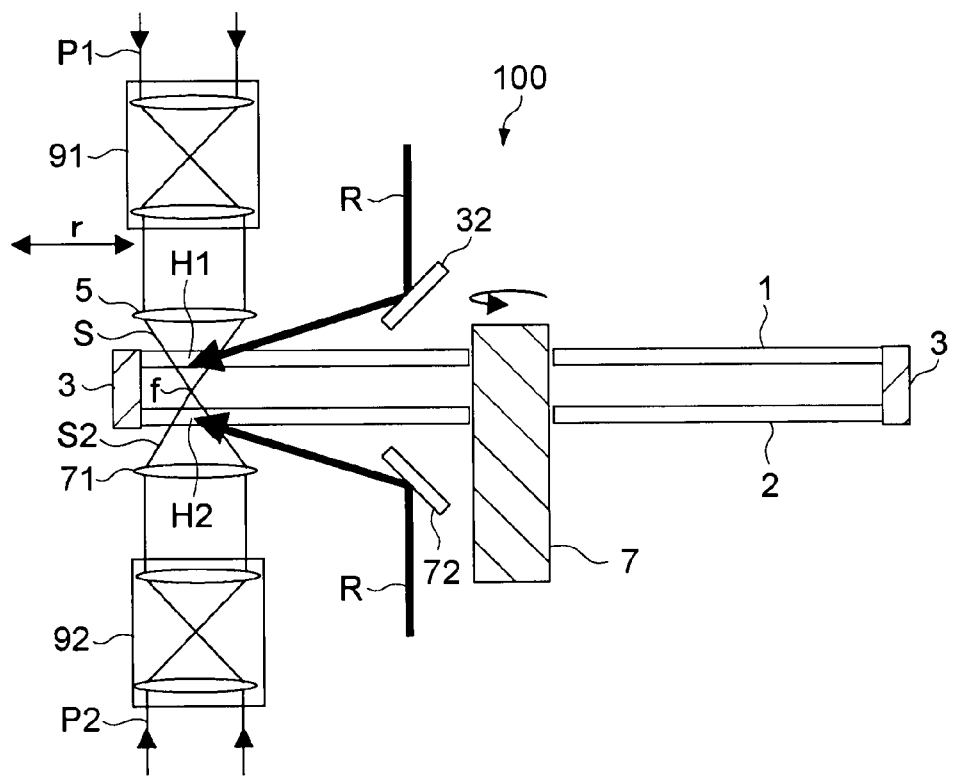
FIG. 27 is a partial cross-sectional diagram showing a master hologram exposing apparatus of a fifth modified example.

FIG. 27 is a partial cross-sectional diagram showing a master hologram exposing apparatus of a fifth modified example.

As shown in FIG. 27, a master hologram exposing apparatus 100 includes a relay lens 91 and a relay lens 92.

The relay lens 91 includes a plurality of lenses whose positions can be adjusted, and is used for adjusting the position of the focal point f of the spherical wave light S in the thickness direction of the master hologram medium 1. The plane wave light P1 incident on the relay lens 91 passes through the relay lens 91 and is caused to enter the objective lens 5.

The relay lenses 91 and 92 are disposed so that they are symmetrical to each other with respect to the master hologram media 1 and 2. The relay lens 92 includes a plurality of lenses whose positions can be adjusted, and is used for adjusting the position of the focal point f of the spherical wave light S2 in the thickness direction of the master hologram medium 1, to thereby match the focal point f of the spherical wave light S2 with the focal point f of the spherical wave light S. The plane wave light P2 incident on the relay lens 92 passes therethrough and is caused to enter the objective lens 71.

Figure 28:
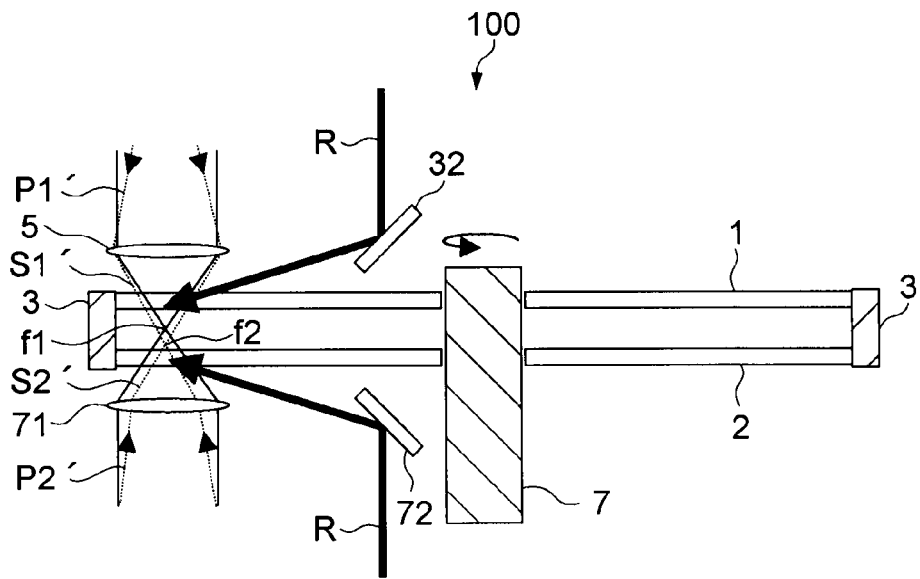
FIG. 28 is a diagram for explaining a position of focal point of the master hologram exposing apparatus of the fifth modified example.

FIG. 28 is a diagram for explaining the position of the focal point of the master hologram exposing apparatus of the fifth modified example.

By adjusting the positions of the plurality of lenses of the relay lens 91 shown in FIG. 27, plane wave light P1' shown in FIG. 28 is generated. The plane wave light P1' enters the objective lens 5, and spherical wave light S1' whose focal position corresponds to a focal point f2 is generated.

By adjusting the positions of the plurality of lenses of the relay lens 92 shown in FIG. 27, plane wave light P2' shown in FIG. 28 is generated. The plane wave light P2' enters the objective lens 71, and spherical wave light S2' whose focal position corresponds to the focal point f2 is generated.

That is, by adjusting the positions of the plurality of lenses of the relay lenses 91 and 92, the focal positions of the spherical wave light S (S1') and the spherical wave light S2 (S2') are adjusted in the thickness direction of the master hologram medium 1, with the result that the focal points can match with each other at the focal point f1 or f2 shown in FIG. 28, for example.

Figure 29:
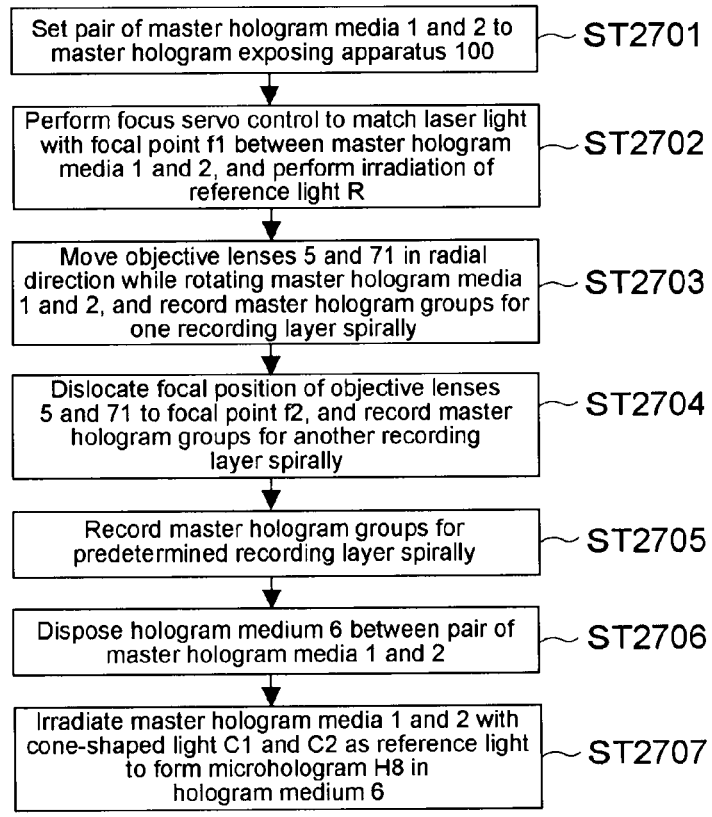
FIG. 29 is a flowchart showing a method of recording the hologram using the master hologram exposing apparatus shown in FIG. 27.
Figure 30:
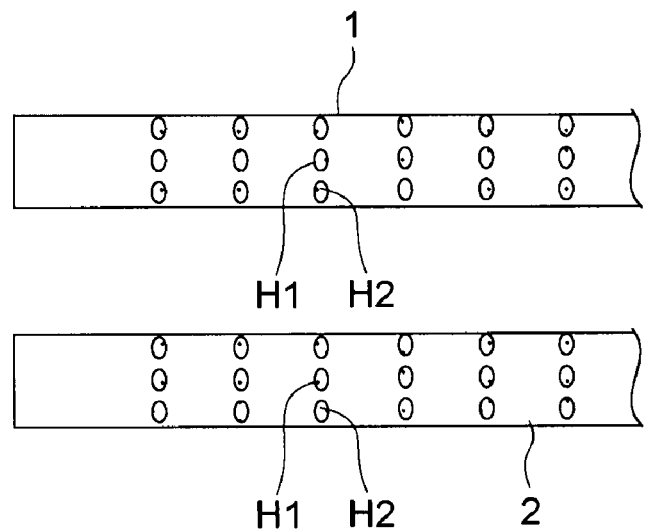
FIG. 30 is a partial cross-sectional diagram showing a master hologram medium in which master holograms are formed.

FIG. 29 is a flowchart showing a method of recording the hologram using the master hologram exposing apparatus 100 shown in FIG. 27. FIG. 30 is a partial cross-sectional diagram showing a master hologram medium in which master holograms are formed.

As shown in FIG. 29, the pair of the master hologram media 1 and 2 is set to the spindle 7 of the master hologram exposing apparatus 100 so that the master hologram media 1 and 2 face each other with the predetermined interval h, and the outer peripheries of the master hologram media 1 and 2 are fixed in parallel by the medium fixing member 3 (ST2701).

The positions of the plurality of lenses of the relay lens 91 and the relay lens 92 are adjusted, and the focal positions of the spherical wave light S1 and the spherical wave light S2 are matched at the focal point f1. Further, the master hologram medium 1 is obliquely irradiated with the reference light R through the mirror 32 from the outside of the master hologram medium 1, and the master hologram medium 2 is obliquely irradiated with the reference light R through the mirror 72 from the outside of the master hologram medium 2 (ST2702).

By driving a driving motor (not shown), the master hologram media 1 and 2 are rotated, and the objective lenses 5 and 71 and the like are moved in the radial direction r of the master hologram medium 1. As a result, the master hologram media 1 and 2 and the reference light R interfere with each other, and thus the master holograms H1 are spirally formed in the master hologram media 1 and 2 as shown in FIG. 30 (ST2703).

The positions of the plurality of lenses of the relay lens 91 and the relay lens 92 are adjusted, the focal positions of the spherical wave light S1' and the spherical wave light S2' are matched at the focal point f2, the master hologram medium 1 is obliquely irradiated with the reference light R through the mirror 32 from the outside of the master hologram medium 1, and the master hologram medium 2 is obliquely irradiated with the reference light R through the mirror 72 from the outside of the master hologram medium 2. As a result, as shown in FIG. 30, the master holograms H2 are spirally formed in the master hologram media 1 and 2 (ST2704). This process is repeated as many times as the predetermined recording layers, to thereby manufacture the hologram medium in which hologram groups are formed in a plurality of layers as shown in FIG. 30 (ST2705).

As shown in FIG. 25, the hologram medium 6 is disposed between the pair of the master hologram media 1 and 2, and the outer peripheries thereof are fixed in parallel by the medium fixing member 3 (ST2706).

The plane wave light P1 is caused to enter the conical mirror 61, and the cone-like shaped light C1 is generated. The plane wave light P2 is caused to enter the conical mirror 81, and the cone-like shaped light C2 is generated.

The cone-like shaped light C1 is caused to enter the master holograms H1 in the master hologram medium 1 shown in FIG. 30, to thereby generate a plurality of spherical wave light beams S1. The cone-like shaped light C2 is caused to enter the master holograms H1 in the master hologram medium 2 shown in FIG. 30, to thereby generate a plurality of spherical wave light beams S2. The plurality of spherical wave light beams S1 and S2 interfere with each other in the hologram medium 6, and thus the plurality of microholograms H8 are formed as shown in FIG. 18 (ST2707). In the same way, the cone-like shaped light C1 is caused to enter the master holograms H2 in the master hologram medium 1 shown in FIG. 30, to thereby generate a plurality of spherical wave light beams. The cone-like shaped light C2 is caused to enter the master holograms H2 in the master hologram medium 2 shown in FIG. 30, to thereby generate a plurality of spherical wave light beams. The plurality of spherical wave light beams interfere with each other in the hologram medium 6, and thus a plurality of holograms are formed in a plurality of layers as shown in FIG. 18.

As described above, the positions of the plurality of lenses of the relay lenses 91 and 92 are adjusted, with the result that hologram groups in a plurality of layers as shown in FIG. 18 can be manufactured in the pair of the master hologram media 1 and 2. Using the pair of the master hologram media 1 and 2, by performing exposure once with the use of the hologram exposing apparatus 80 shown in FIG. 25, the hologram medium 6 in which the hologram groups in the plurality of layers are formed as shown in FIG. 18 can be manufactured. Accordingly, in a case of forming master holograms in the master hologram media 1 and 2, another pair of master hologram media is not required to be set to the master hologram exposing apparatus, and one-time exposure can form a large number of holograms, which can significantly reduce the manufacturing time. As a result, a massive amount of the read-only (ROM) hologram media 6 that use the microholograms can be manufactured, although the manufacturing has been considered to be difficult up until now.

An additional master hologram medium other than the master hologram media 1 and 2 is not required, so the manufacturing cost of the master hologram medium can be reduced.

Address information and servo information are recorded in advance on positions corresponding to the depths of the plurality of layers of the hologram medium 6 using the microholograms as described above. The writable hologram medium 6 that forms a microhologram as recording information based on the address information and the servo information while controlling the optical system can be manufactured in a short time.

Figure 31:
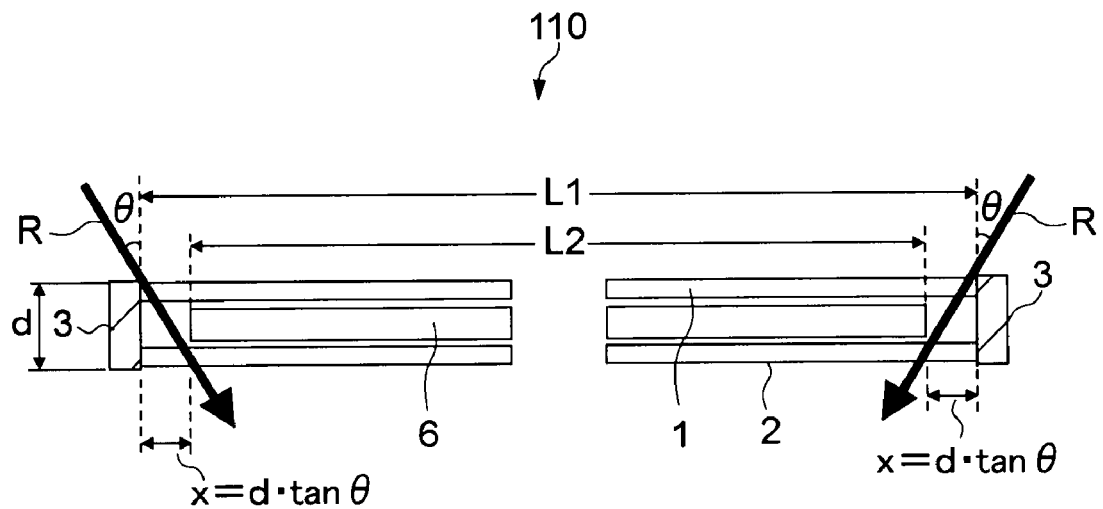
FIG. 31 is a partial cross-sectional diagram showing another hologram exposing apparatus.

FIG. 31 is a partial cross-sectional diagram showing another hologram exposing apparatus.

As shown in FIG. 31, a diameter L1 of the master hologram medium 1 used in the hologram exposing apparatus 110 is longer than a diameter L2 of the hologram medium 6. (The same holds true for the master hologram medium 2.)

When the thickness of the master hologram media 1 and 2 and the hologram medium 6 combined is represented as a thickness d, and an incident angle of the reference light R with respect to the master hologram medium 1 is represented as an incident angle θ, the diameter L1 of the master hologram medium 1 is longer than the diameter L2 of the hologram medium 6 by twice a length x (=d*tan θ).

With this structure, by setting the diameter L1 of the master hologram medium 1 to be longer than the diameter L2 of the hologram medium 6 by twice the length x (=d*tan θ), the hologram can be formed in an outermost peripheral portion of the hologram medium 6.

When a numerical aperture NA of the objective lens 5 is, e.g., 0.8, the incident angle θ of the reference light R can be set to a minimum of about 55 degrees. When the thickness of each of the master hologram media 1 and 2 is 200 μm and the thickness of the hologram medium 6 is 600 μm, the thickness d becomes about 1,000 μm, and the length x becomes 1,428 μm. In this case, when the diameter L1 of the master hologram media 1 and 2 is set to be longer than the diameter L2 of the hologram medium 6 by twice the length x (=1,428 μm), the hologram can be formed up to the outermost peripheral portion of the hologram medium 6. As a result, a part of the hologram medium 6 to be mass-produced that is incapable of being exposed can be eliminated. Further, the medium fixing member 3 and the like of the hologram exposing apparatus 40 are formed of transparent members, which can also eliminate the part incapable of being exposed in the hologram medium 6.

Figure 32:
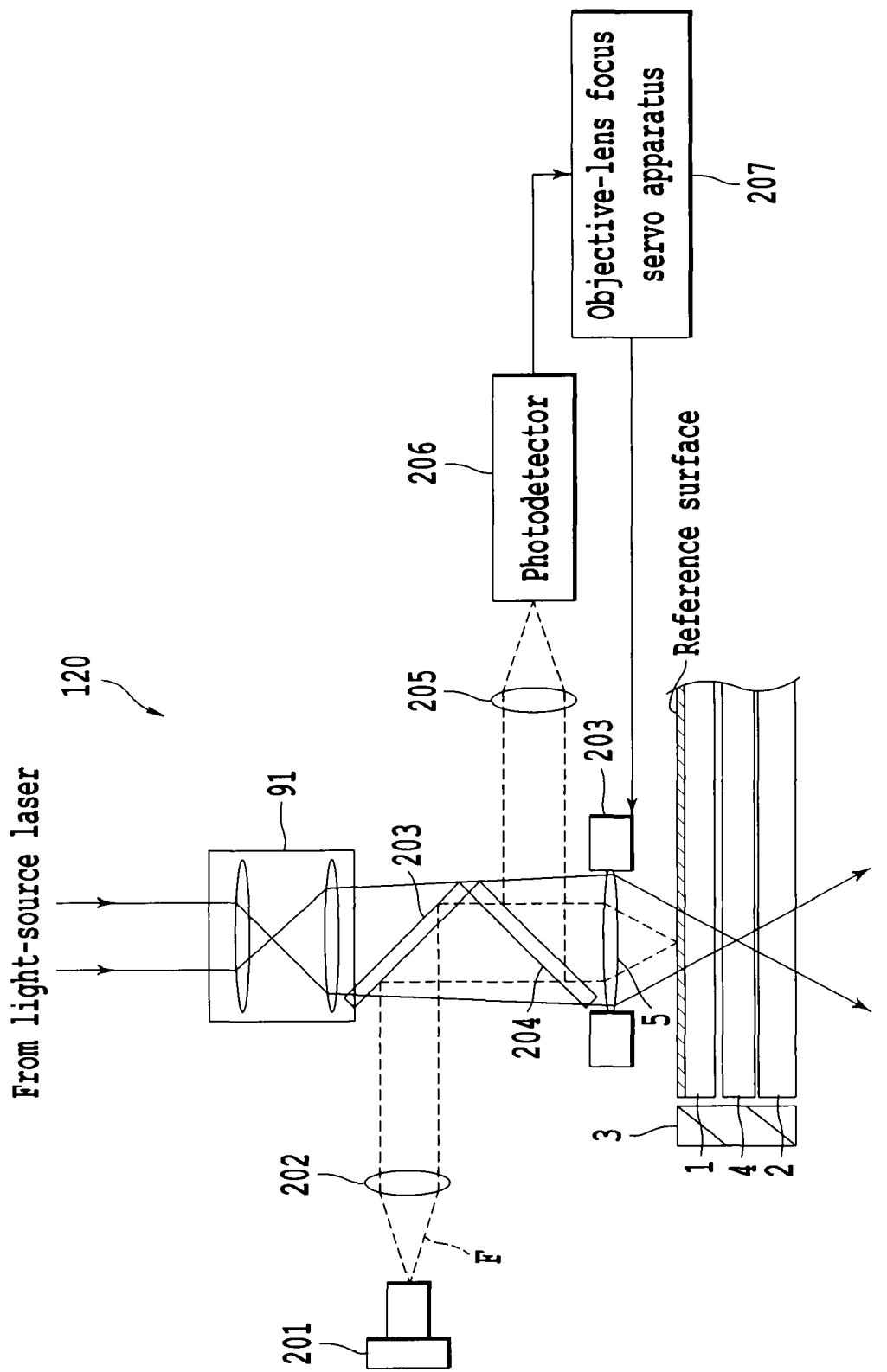

FIG. 32 is a diagram showing an optical servomechanism of the above-described master hologram exposing apparatus 10 or the like.

As shown in FIG. 32, an optical servomechanism 120 includes a servo-only laser 201, a lens 202, a beam splitter 203, a beam splitter 204, a condensing lens 205, a photodetector for focus servo 206, an objective-lens focus servo apparatus 207, and an objective lens actuator 208.

The servo-only laser 201 emits focus servo light F only for focus servo, whose wavelength is, e.g., 630 nm, toward the lens 202. The laser light that passes through the relay lens 91 has a wavelength of e.g., 405 nm and is used for recording.

The lens 202 causes the focus servo light F to travel toward the beam splitter 203.

The beam splitter 203 reflects the focus servo light F toward the objective lens 5.

The beam splitter 204 causes the focus servo light F from the beam splitter 203 to pass therethrough. The focus servo light F that has passed through the beam splitter 204 is condensed by the objective lens 5 and reflected by a reference surface of the master hologram medium 1. The reference surface of the master hologram medium 1 functions as a wavelength-selective film that reflects the focus servo light F but causes laser light for recording to pass therethrough. The focus servo light F reflected by the reference surface passes through the objective lens 5 and enters the beam splitter 204. The beam splitter 204 reflects the incident focus servo light F toward the condensing lens 205.

The condensing lens 205 condenses the focus servo light F reflected by the beam splitter 204 to the photodetector 206.

Based on the focus servo light F from the condensing lens 205, the photodetector 206 outputs a signal to the objective-lens focus servo apparatus 207 by an astigmatic method, for example.

The objective-lens focus servo apparatus 207 outputs a control signal for controlling the objective lens actuator 208, based on the signal from the photodetector 206.

Based on the control signal from the objective-lens focus servo apparatus 207, the objective lens actuator 208 moves the objective lens 5 to be subjected to focusing control.

With this structure, the position of the objective lens 5 is adjusted, a distance between the objective lens 5 and the master hologram medium 1 is kept constant, the focus servo control on the plane wave light is accurately performed, and the master hologram can be formed at an accurate position. By recording groups and pits on the reference surface in advance, tracking servo control can be performed on the objective lens 5.

Figure 33:
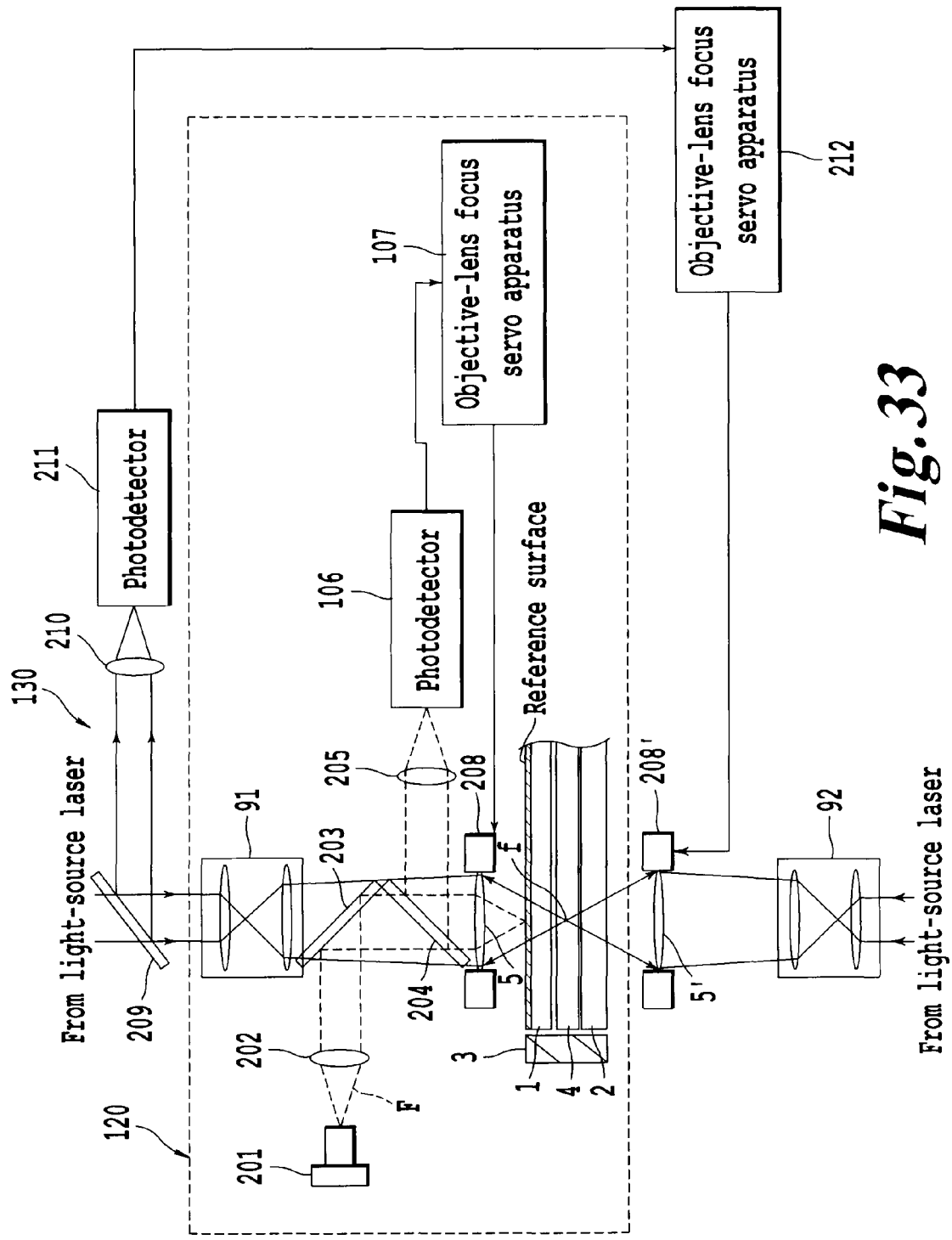
FIG. 33 is a diagram showing an optical servomechanism of another master hologram exposing apparatus.

FIG. 33 is a diagram showing an optical servomechanism of the master hologram exposing apparatus 70 or the like.

As shown in FIG. 33, an optical servomechanism 130 includes the relay lens 92, an objective lens 5', a mirror 209, a condensing lens 210, a photodetector 211, an objective-lens focus servo apparatus 212, and an objective lens actuator 208'.

The plane wave light that has a wavelength of 405 nm and is emitted from the laser light source (not shown) enters the relay lens 92. The relay lens 92 is used for adjusting the position of the focal point f of the spherical wave light formed by the objective lens 5' in the thickness direction of the master hologram medium 2.

The objective lens 5' changes the plane wave light from the relay lens 92 into the spherical wave light whose focal point f is positioned between the master hologram media 1 and 2.

The mirror 209 reflects, toward the condensing lens 210, laser light (laser light that travels upward from a lower part in FIG. 33) that has passed through the objective lens 5', the master hologram media 1 and 2, the objective lens 5, the beam splitters 204 and 203, and the relay lens 91.

The condensing lens 210 condenses the laser light from the mirror 209 to the photodetector 211.

The photodetector 211 uses the laser light from the condensing lens 210 as focus servo light. That is, based on the focus servo light, the photodetector 211 outputs a signal to the objective-lens focus servo apparatus 212 by the astigmatic method, for example.

The objective-lens focus servo apparatus 212 outputs a control signal used for controlling the objective lens actuator 208', based on the signal from the photodetector 211.

Based on the control signal from the objective-lens focus servo apparatus 212, the objective lens actuator 208' moves the objective lens 5' to be subjected to the focus control.

With this structure, the position of the objective lenses 5 and 5' are adjusted, a relative distance between the objective lens 5 and the objective lens 5' is kept constant, a distance between the objective lens 5 and the master hologram medium 1 is kept constant, and a distance between the objective lens 5' and the master hologram medium 2 is kept constant. Further, the focus servo control can be accurately performed on the plane wave light, and the master hologram can be formed at the accurate position.

It should be noted that the present invention is not limited to the above-described embodiment, and can be variously changed within the scope of the technical idea of the present invention.

What is claimed is:

1. A hologram medium manufacturing method, comprising:
    disposing a first pair of master hologram media with a predetermined interval so that the first pair of the master hologram media face each other;
    forming a master hologram in the master hologram media by irradiating the first pair of the master hologram media with spherical wave light and reference light so that the spherical wave light and the reference light interfere with each other in the master hologram media, the spherical wave light and the reference light having a focal point between the first pair of the master hologram media;
    disposing a hologram medium between the first pair of the master hologram media; and
    forming a hologram in the hologram medium by irradiating the first pair of the master hologram media with the reference light.

2. The hologram medium manufacturing method according to claim 1,
    wherein the master hologram media and the hologram medium each have a disk shape, and
    wherein the master hologram media each have a diameter larger than a diameter of the hologram medium.

3. The hologram medium manufacturing method according to claim 2,
    wherein when the master hologram is formed in the master hologram media, the master hologram media are rotated and a position irradiated with the spherical wave light is shifted in a radial direction of the master hologram media.

4. The hologram medium manufacturing method according to claim 1,
    wherein the reference light is plane wave light.

5. The hologram medium manufacturing method according to claim 1,
    wherein the reference light emitted when the master hologram is formed in the master hologram media vertically enters the master hologram media in a direction opposite to a direction in which the spherical wave light propagates.

6. The hologram medium manufacturing method according to claim 5,
    wherein the reference light emitted when the hologram is formed in the hologram medium vertically enters the master hologram media from one of the outsides of the first pair of the master hologram media, passes therethrough, is reflected by a reflection mirror, and enters and passes through the master hologram media.

7. The hologram medium manufacturing method according to claim 1,
    wherein the reference light emitted when the master hologram is formed in the master hologram media obliquely enters the master hologram media from one of the outsides of the first pair of the master hologram media.

8. The hologram medium manufacturing method according to claim 7,
    wherein the reference light emitted when the hologram is formed in the hologram medium obliquely enters the master hologram media from outsides of the first pair of the master hologram media in opposite directions.

9. The hologram medium manufacturing method according to claim 8,
    wherein when the hologram is formed in the hologram medium, the reference light is reflected by portions on a generatrix of a conical mirror, one of the master hologram media is irradiated with the reference light, the reference light is reflected by portions on a generatrix of an inverted conical mirror, and the other master hologram medium is irradiated with the reference light.

10. The hologram medium manufacturing method according to claim 1,
    wherein the reference light emitted when the master hologram is formed in the master hologram media obliquely enters the master hologram media from outsides of the first pair of the master hologram media in opposite directions.

11. The hologram medium manufacturing method according to claim 10,
    wherein the reference light emitted when the hologram is formed in the hologram medium obliquely enters the master hologram media from one of the outsides of the first pair of the master hologram media.

12. The hologram medium manufacturing method according to claim 1,
    wherein when the master hologram is formed in the master hologram media, a correcting plate having the same refractive index as the hologram medium is disposed between the first pair of the master hologram media.

13. The hologram medium manufacturing method according to claim 1,
    wherein the master hologram media are irradiated with beams of the spherical wave light from outsides of the master hologram media so that focal points of the beams of the spherical wave light coincide with each other, and
    wherein the reference light emitted when the master hologram is formed in the master hologram media obliquely enters the master hologram media from one of the outsides of the first pair of the master hologram media.

14. The hologram medium manufacturing method according to claim 13,
    wherein the reference light emitted when the hologram is formed in the hologram medium obliquely enters the master hologram media from one of the outsides of the first pair of the master hologram media.

15. The hologram medium manufacturing method according to claim 1,
    wherein the reference light emitted when the master hologram is formed in the master hologram media obliquely enters the master hologram media from outsides of the first pair of the master hologram media and from the same side with respect to an area in which the spherical wave light propagates.

16. The hologram medium manufacturing method according to claim 15,
wherein the reference light emitted when the hologram is formed in the hologram medium obliquely enters the master hologram media from the outsides of the first pair of the master hologram media and from the same side with respect to the focal point.

17. The hologram medium manufacturing method according to claim 16,
wherein when the hologram is formed in the hologram medium, the reference light is reflected by portions on a generatrix of a first conical mirror, one of the master hologram media is irradiated with the reference light reflected, the reference light is reflected by portions on a generatrix of a second conical mirror, and the other master hologram medium is irradiated with the reference light reflected.

18. The hologram medium manufacturing method according to claim 1, further comprising:
disposing, instead of the first pair of the master hologram media, a second pair of master hologram media with a predetermined interval so that the second pair of the master hologram media face each other;
forming another master hologram in the second pair of the master hologram media by irradiating the second pair of the master hologram media with spherical wave light and reference light so that the spherical wave light and the reference light interfere with each other in the second pair of the master hologram media, the spherical wave light and the reference light having a focal point at a different position between the second pair of the master hologram media;
disposing the hologram medium between the second pair of the master hologram media; and
forming another hologram in the hologram medium by irradiating the second pair of the master hologram media with the reference light.

19. The hologram medium manufacturing method according to claim 1, further comprising:
forming another master hologram in the master hologram media by irradiating the master hologram media with spherical wave light and reference light so that the spherical wave light and the reference light interfere with each other in the master hologram media, the spherical wave light and the reference light having a focal point at a different position in a thickness direction of the first pair of the master hologram media therebetween; and
forming another hologram in the hologram medium by irradiating the another master hologram in the first pair of the master hologram media with reference light.

20. The hologram medium manufacturing method according to claim 1,
wherein the hologram medium is a writable medium, and
wherein the hologram is address information.

21. The hologram medium manufacturing method according to claim 1,
wherein the hologram medium is a writable medium, and
wherein the hologram is servo information.

22. The hologram medium manufacturing method according to claim 1,
wherein the hologram medium is a read-only medium.

23. A hologram medium manufacturing apparatus, comprising:
means for disposing a pair of master hologram media with a predetermined interval so that the pair of the master hologram media face each other;
an optical mechanism configured to form a master hologram in the master hologram media by irradiating the pair of the master hologram media with spherical wave light and reference light so that the spherical wave light and the reference light interfere with each other in the master hologram media, the spherical wave light and the reference light having a focal point between the pair of the master hologram media;
means for disposing and fixing a hologram medium between the pair of the master hologram media; and
an exposing means for forming a hologram in the hologram medium by irradiating the pair of the master hologram media with the reference light.

* * * * *